(12) United States Patent
van Erven et al.

(10) Patent No.: US 11,709,652 B2
(45) Date of Patent: *Jul. 25, 2023

(54) TECHNIQUES FOR REDUCING LATENCY IN A WIRELESS HOME THEATER ENVIRONMENT

(71) Applicant: Sonos, Inc., Santa Barbara, CA (US)

(72) Inventors: Niels van Erven, Hacienda Heights, CA (US); Yong Ma, Boston, MA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/859,755

(22) Filed: Jul. 7, 2022

(65) Prior Publication Data

US 2022/0342630 A1    Oct. 27, 2022

Related U.S. Application Data

(63) Continuation of application No. 17/186,683, filed on Feb. 26, 2021, now Pat. No. 11,422,770.
(Continued)

(51) Int. Cl.
*G06F 3/0482* (2013.01)
*G06F 3/16* (2006.01)
(Continued)

(52) U.S. Cl.
CPC ........... *G06F 3/165* (2013.01); *H04B 17/327* (2015.01); *H04S 3/008* (2013.01); *H04S 2400/01* (2013.01)

(58) Field of Classification Search
CPC ........ G06F 16/60; G06F 3/165; G06F 1/1616; G06F 1/1683; G06F 1/1698;
(Continued)

(56) References Cited

U.S. PATENT DOCUMENTS 5,440,644 A   8/1995   Farinelli et al.
5,761,320 A   6/1998   Farinelli et al.
(Continued)

FOREIGN PATENT DOCUMENTS

EP    1389853 A1      2/2004
WO    200153994       7/2001
WO    2003093950 A2   11/2003

OTHER PUBLICATIONS

AudioTron Quick Start Guide, Version 1.0, Mar. 2001, 24 pages.
(Continued)

*Primary Examiner* — Rayeez R Chowdhury
(74) *Attorney, Agent, or Firm* — Finch & Maloney PLLC

(57) ABSTRACT

A first playback device can include a wireless network interface, an audio input interface, one or more processors, and data storage. The data storage stores instructions that, when executed by the processors, cause the first playback device to determine a first radio frequency (RF) energy level associated with RF signal communications from a second playback device to the first playback device. The first playback device modifies a threshold RF energy level for holding off transmissions by the first playback device based on the first RF energy level. The first playback device receives multi-channel audio content via the audio input interface and detects an ambient RF energy level. Based on the ambient RF energy level and the threshold RF energy level, data that represents a channel of the multi-channel audio content is communicated by the first playback device to the second playback device for playback by the second playback device in synchrony with playback of one or more other channels of the multi-channel audio content by the first playback device.

18 Claims, 15 Drawing Sheets

Related U.S. Application Data

(60) Provisional application No. 62/984,656, filed on Mar. 3, 2020.

(51) Int. Cl.
*H04S 3/00* (2006.01)
*H04B 17/327* (2015.01)

(58) Field of Classification Search
CPC ............... G06F 1/1681; H04L 12/2838; H04L 2012/2849; H04L 41/0816; H04L 41/0836; H04L 41/12; H04L 43/08; H04L 43/16; H04L 45/02; H04L 45/121; H04L 45/70; H04R 2227/005; H04R 2420/07; H04R 27/00; H04R 2205/024; H04R 2227/003; H04R 2420/01; H04R 29/007; H04R 3/00; H04R 5/04; H04R 3/12; H04W 16/14; H04W 72/082; H04W 88/06; H04W 28/0236; H04W 84/18
See application file for complete search history.

(56) References Cited

U.S. PATENT DOCUMENTS

| | | | |
|---|---|---|---|
| 5,923,902 | A | 7/1999 | Inagaki |
| 6,032,202 | A | 2/2000 | Lea et al. |
| 6,256,554 | B1 | 7/2001 | DiLorenzo |
| 6,404,811 | B1 | 6/2002 | Cvetko et al. |
| 6,469,633 | B1 | 10/2002 | Wachter |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang |
| 6,778,869 | B2 | 8/2004 | Champion |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,391,791 | B2 | 6/2008 | Balassanian et al. |
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington |
| 8,483,853 | B1 | 7/2013 | Lambourne |
| 8,638,959 | B1 * | 1/2014 | Hall .................... H04R 5/02 381/160 |
| 8,942,252 | B2 | 1/2015 | Balassanian et al. |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0157951 | A1 | 8/2003 | Hasty, Jr. |
| 2004/0024478 | A1 | 2/2004 | Hans et al. |
| 2007/0142944 | A1 | 6/2007 | Goldberg et al. |
| 2013/0301429 | A1 * | 11/2013 | Peters .................... H04L 45/18 370/252 |
| 2013/0336499 | A1 * | 12/2013 | Beckhardt ........... H04L 12/2838 381/81 |
| 2016/0253145 | A1 * | 9/2016 | Lee .......................... G06F 3/162 381/79 |
| 2019/0014414 | A1 * | 1/2019 | Kallai ...................... H03G 3/20 |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc Scatternet for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Notice of Allowance dated Apr. 15, 2022, issued in connection with U.S. Appl. No. 17/186,683, filed Feb. 26, 2021, 10 pages.
Palm, Inc., "Handbook for the Palm VII Handheld," May 2000, 311 pages.
Presentations at WinHEC 2000, May 2000, 138 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

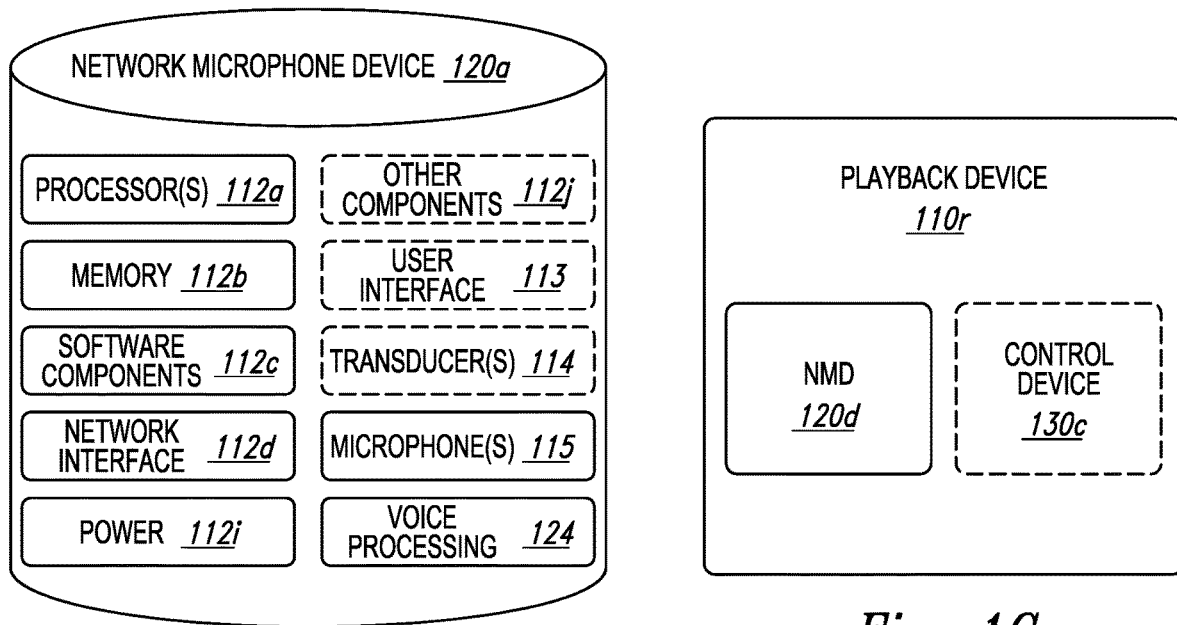
Fig. 1F
Fig. 1G
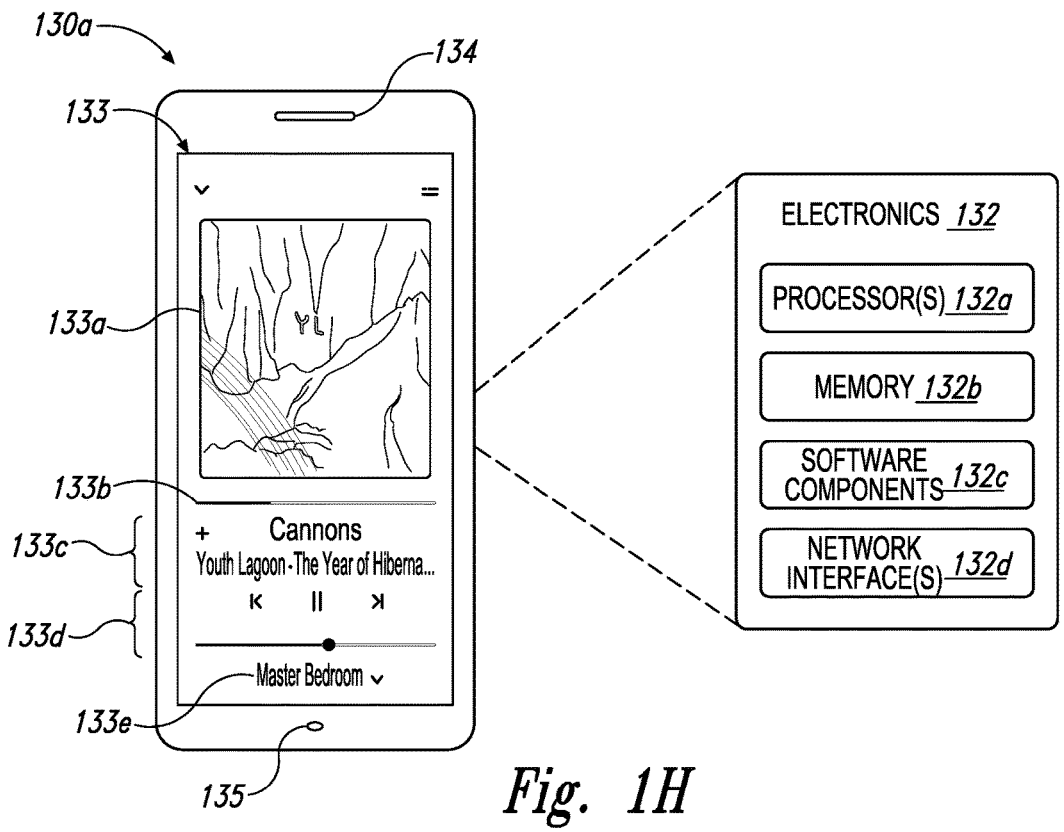
Fig. 1H

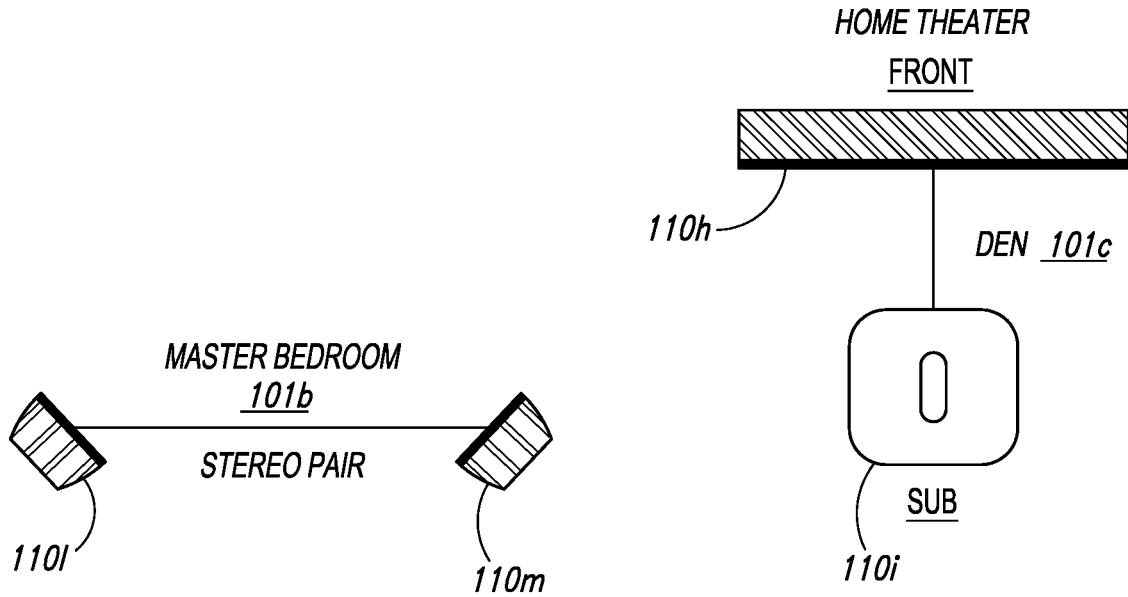
Fig. 1I
Fig. 1J
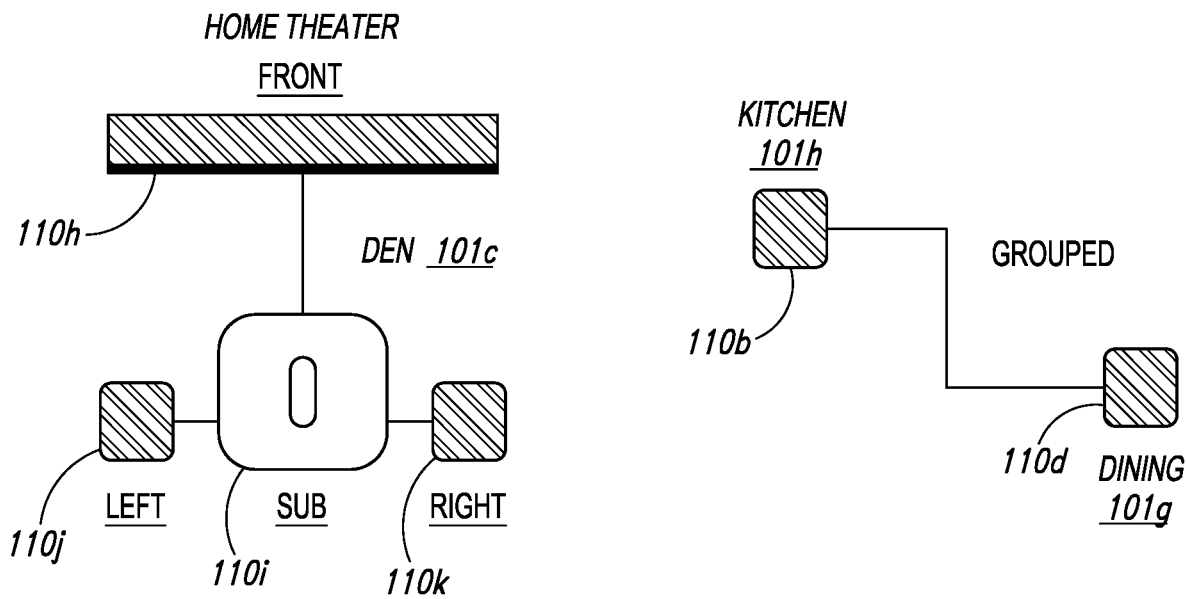
Fig. 1K
Fig. 1L

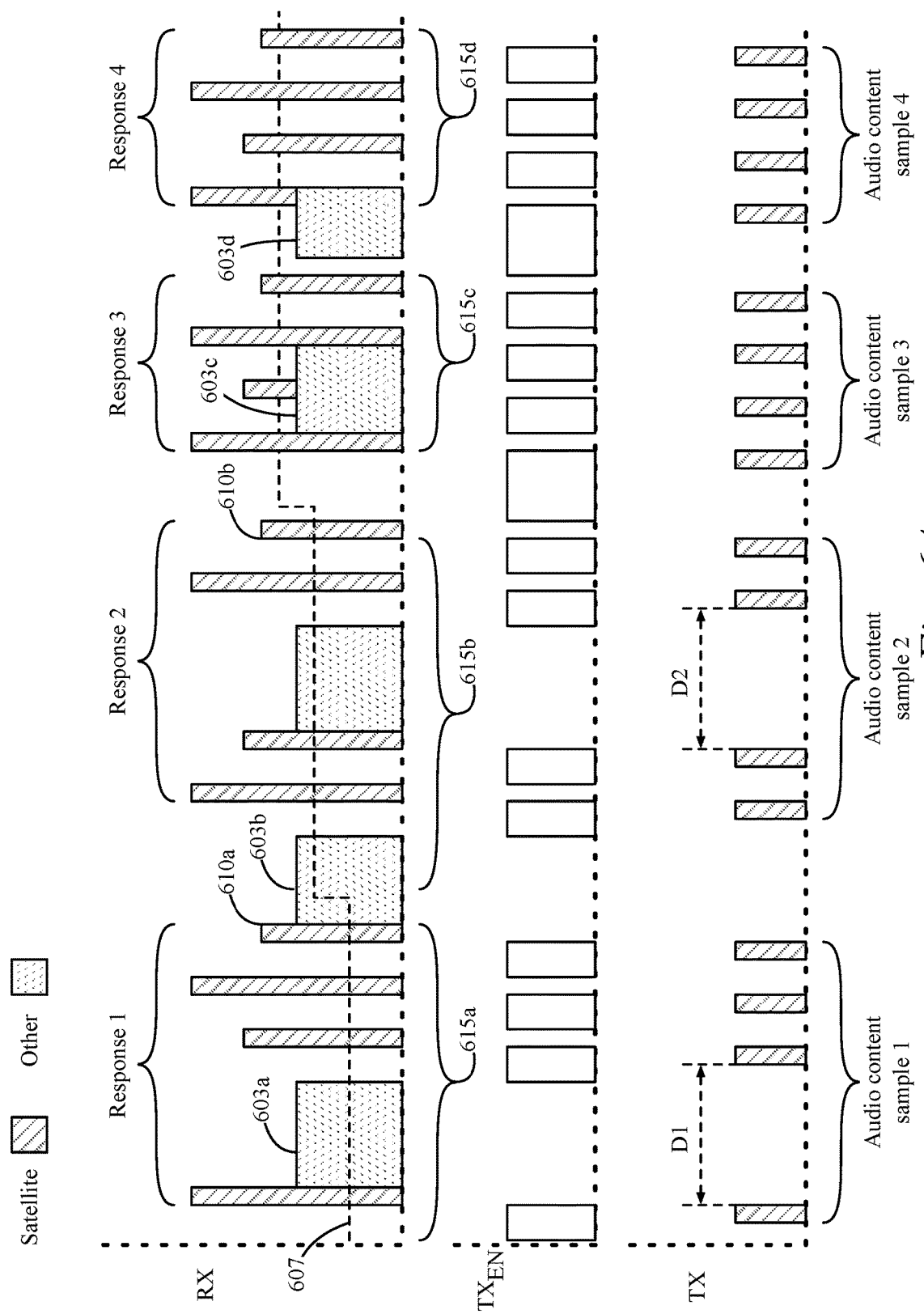

TECHNIQUES FOR REDUCING LATENCY IN A WIRELESS HOME THEATER ENVIRONMENT

CROSS-REFERENCE TO RELATED APPLICATIONS

This application is a continuation of and claims priority to co-pending U.S. application Ser. No. 17/186,683 filed on Feb. 26, 2021 and titled "TECHNIQUES FOR REDUCING LATENCY IN A WIRELESS HOME THEATER ENVIRONMENT," which claims priority to U.S. Provisional Patent Application No. 62/984,656, filed on Mar. 3, 2020, titled "TECHNIQUES FOR REDUCING LATENCY IN A WIRELESS HOME THEATER ENVIRONMENT," each of which is incorporated herein by reference in its entirety.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until 2002 when SONOS, Inc. began the development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIG. 1F is a block diagram of a network microphone device, in accordance with an example.

FIG. 1G is a block diagram of a playback device, in accordance with an example.

FIG. 1H is a partially schematic diagram of a control device, in accordance with an example.

FIGS. 1I through 1L are schematic diagrams of corresponding media playback system zones, in accordance with an example.

FIGS. 6A and 6B are timing diagrams that illustrate modification of the RSSI threshold, in accordance with an example.

Figure 1A:
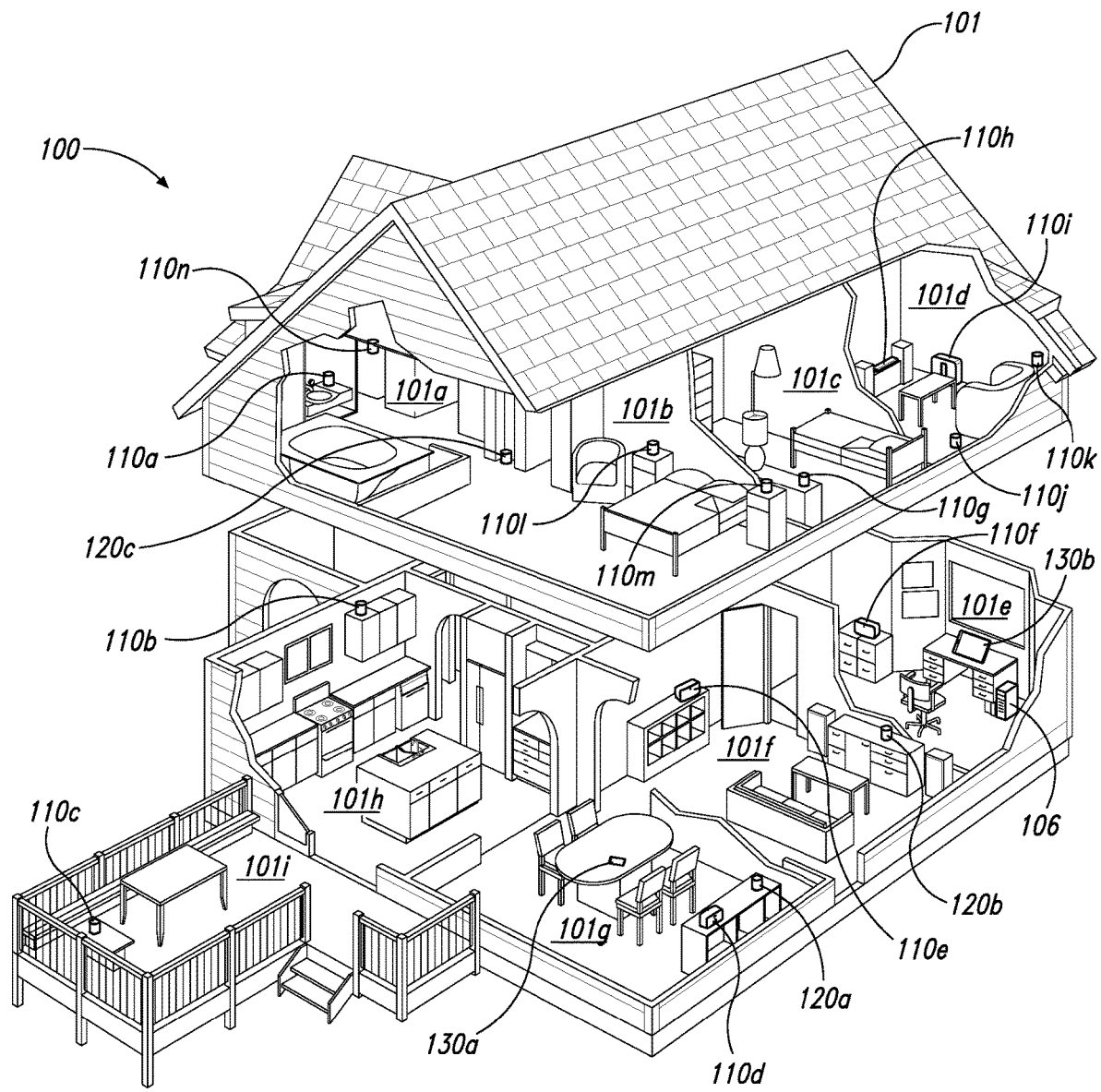
FIG. 1A is a partial cutaway view of an environment having a media playback system, in accordance with an example.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Home theater systems have stringent latency requirements in order to maintain lip-synchrony between the audio being played back by the home theater system and the video content being displayed by a television. These stringent latency requirements arise from the fact that televisions typically are designed to minimize the delay between receipt of media content (e.g., video content and corresponding audio content) from an external source (e.g., a media player, a gaming console, etc.) and output of that media content. As a result, the television will output the audio content and start processing the video content for display immediately upon receipt of the media content. Thus, the home theater system may need to process the audio content received from the television in parallel with the television processing the video content. Given this architecture, the home theater system cannot take substantially longer to output the audio content than the television takes to process the video content without the audio being delayed relative to the video (e.g., losing lip-synchrony). As a result, the home theater system needs to render the audio content within tens of milliseconds of receipt from the television in order to achieve lip-synchronization.

For home theater systems that employ a wireless network to transfer the audio to the requisite playback devices in the home theater system, the time spent packetizing and transmitting the audio content over the wireless network can be quite substantial (e.g., multiple milliseconds). Further, the time required to packetize and transmit the audio over the wireless network increases with the number of wireless speakers in the home theater system. For example, a home theater system that includes two playback devices communicating over the wireless network may need substantially less time to packetize and transmit all of the audio than a similar home theater system including four or more playback devices. As a result, conventional home theater systems that communicate the audio data over a wireless network typically meet the stringent latency requirements for lip-synchronization by severely limiting the number of playback devices in the home theater system to no more than four playback devices (e.g., a front soundbar, a subwoofer, a left rear speaker, and a right rear speaker).

Aspects of the present disclosure manifest an appreciation that one source of latency in wireless communication is the collision avoidance mechanism integrated into many wireless communication standards. These collision avoidance mechanisms typically stop transmission of data from a transmit buffer when activity is detected in a communication channel. The goal of these collision avoidance mechanisms is to avoid a scenario where a device attempts to transmit data in a communication channel while the same device (or another nearby device) is simultaneously attempting to receive data in the same communication channel. For example, a device may prepare a packet for transmission on a particular channel in wireless local area network (WLAN). In this example, the device may detect activity on the channel and wait for the activity to clear before transmitting the packet. In the wireless context, these collision avoidance mechanisms can be triggered by a variety of irrelevant radio frequency (RF) energy in a channel such as operation of an appliance that generates RF energy (e.g., a microwave) and/or transmissions from unrelated network equipment (e.g., a neighbor's access point (AP)). In noisy environments (e.g., densely populated areas such as apartment complexes in an urban setting), the delay introduced by the collision detection mechanism can be substantial and interfere with operation of a device in latency sensitive situations, such as playback of audio content in a home theater system. For example, the wireless transmissions of audio content may be delayed to the point where the audio content fails to reach a playback device before the designated playback time of that audio content. In such an instance, the playback device may either playback the audio late (e.g., out-of-sync with the video and/or causing an echo if other speakers get the audio in time) or simply not playback any audio (e.g., have the playback device dropout).

Embodiments described herein relate to techniques to advantageously reduce the latency in wireless transmission of audio data between playback devices. In these embodiments, the latency may be reduced by mitigating the delays that otherwise would be introduced by a collision avoidance mechanism. For example, the playback device may monitor the received signal strength of packets from a set of one or more devices of interest that the playback device wants to communicate with. After the playback device has identified the set of one or more devices of interest, the playback device may reduce the sensitivity of the collision avoidance mechanism based on the received signal strength of the transmissions from the set of one or more devices of interest. In particular, the collision avoidance mechanism may be strategically desensitized such that the collision avoidance mechanism is still triggered by transmissions from any of the devices of interest while being less likely to be triggered by other sources (e.g., operation of microwaves, communication by devices other than the devices of interest, etc.). By strategically desensitizing the collision avoidance mechanism, the playback device maintains reliable communication with the devices of interest while ignoring other sources of RF energy so as to reduce the number of instances where the collision avoidance mechanism impedes packet transmissions.

In the context of a home theater system, the one or more devices of interest may include the other playback devices within the home theater system. For example, a soundbar in a surround sound system comprising the soundbar, a subwoofer, and two rear satellites may identify the subwoofer and the two rear satellites as devices of interest. In this example, the soundbar may strategically reduce the sensitivity of the collision avoidance mechanism such that the collision avoidance mechanism is not triggered by activity in a channel with a signal strength that is below (e.g., by a margin) the signal strength of communications from the subwoofer and the two rear satellites. Thus, the soundbar can effectively ignore activity in the channel that is unlikely to be a transmission from the subwoofer and the two rear satellites without compromising communication with the subwoofer and the two rear satellites. As a result, the amount of latency introduced by the collision avoidance mechanism is substantially reduced (particularly in noisy environments). This reduction in latency may advantageously enable the home theater system to support wireless communication of audio data between a larger number of playback devices than conventional techniques while still meeting the stringent latency requirements for lip-synchronization with the video output by a television. The ability to support wireless communication of audio data between a larger number of playback devices may advantageously enable support for more sophisticated audio standards, such as DOLBY ATMOS.

Any of a variety of approaches may be employed to effectuate a dynamic sensitivity adjustment of the collision avoidance mechanism in accordance with the latency reduction techniques described herein. In some implementations, the sensitivity adjustment of the collision avoidance mechanism may be achieved by modifying (e.g., via program instructions executed by one or more processors) one or more parameters associated with the collision avoidance mechanism. For example, the collision avoidance mechanism may employ one or more thresholds that govern when the collision avoidance mechanism activates (e.g., a signal detect threshold and/or an energy detect threshold in 802.11 standards). In this example, the sensitivity of the collision detection mechanism may be adjusted by modifying the one or more thresholds (e.g., via program instructions executed by the one or more processors). Additionally (or alternatively), the sensitivity adjustment of the collision avoidance mechanism may be achieved by dynamically modifying an amount of gain (e.g., amplification) applied to a wireless signal detected by an antenna. For example, the RF energy levels for a detected wireless signal that are employed by the collision detection mechanism are typically measured after the gain from electrical components (e.g., amplifiers) has already been applied. Thus, the gain provided by those electrical components may be modified while the RF energy level for a wireless signal is being measured for the collision avoidance mechanism to change the value of the RF energy level seen by the collision avoidance mechanism. As a result, the RF energy level seen by the collision avoidance mechanism may be, for example, decreased to reduce the probability that the collision detection mechanism impedes a packet transmission. The gain applied to a detected wireless signal may be modified in any of a variety of ways. For example, the gain may be reduced by bypassing one or more amplifiers (e.g., by closing a bypass switch coupled in parallel with an amplifier) coupled to the antenna. Similarly, the gain may be increased by activating one or more amplifiers (e.g., by opening a bypass switch coupled in parallel with an amplifier) coupled to the antenna.

The latency reduction techniques described herein may be readily applied to any of a variety of devices including, for example, a playback device capable of operating in a home theater system. The playback device may include a wireless network interface (e.g., comprising a wireless transceiver such as an 802.11 wireless transceiver), an audio input interface (e.g., comprising a port and/or associated circuitry configured to receive audio content from an external source, such as a television, a DVD player, a gaming console, a video streaming device, etc.), one or more processors, and data storage. The data storage stores instructions that when executed by the one or more processors, cause the playback device to determine a first RF energy level associated with RF signal communications from another playback device to the playback device. The playback device may modify a threshold RF energy level for holding off transmissions (e.g., an threshold associated with a collision detection mechanism such as a signal detect threshold and/or an energy detect threshold in 802.11) by the playback device based on the first RF energy level. The playback device may receive multi-channel audio content via the audio input interface and detect an ambient RF energy level. Based on the ambient RF energy level and the threshold RF energy level, data that represents a channel of the multi-channel audio content may be communicated by the playback device to the other playback device for playback by the other playback device in synchrony with playback of one or more other channels of the multi-channel audio content by the playback device.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 110a is first introduced and discussed with reference to FIG. 1A. Many of the details, dimensions, angles and other features shown in the Figures are merely illustrative of particular embodiments of the disclosed technology. Accordingly, other embodiments can have other details, dimensions, angles, and features without departing from the spirit or scope of the disclosure. In addition, those of ordinary skill in the art will appreciate that further embodiments of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110a-n), one or more network microphone devices ("NMDs"), 120 (identified individually as NMDs 120a-c), and one or more control devices 130 (identified individually as control devices 130a and 130b).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the media playback system 100 is configured to play back audio from a first playback device (e.g., the playback device 100a) in synchrony with a second playback device (e.g., the playback device 100b). Interactions between the playback devices 110, NMDs 120, and/or control devices 130 of the media playback system 100 configured in accordance with the various embodiments of the disclosure are described in greater detail below with respect to FIGS. 1B-1M.

In the illustrated embodiment of FIG. 1A, the environment 101 comprises a household having several rooms, spaces, and/or playback zones, including (clockwise from upper left) a master bathroom 101a, a master bedroom 101b, a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in FIG. 1A. Each zone may be given a name according to a different room or space such as the office 101e, master bathroom 101a, master bedroom 101b, the second bedroom 101c, kitchen 101h, dining room 101g, living room 101f, and/or the balcony 101i. In some aspects, a single playback zone may include multiple rooms or spaces. In certain aspects, a single room or space may include multiple playback zones.

In the illustrated embodiment of FIG. 1A, the master bathroom 101a, the second bedroom 101c, the office 101e, the living room 101f, the dining room 101g, the kitchen 101h, and the outdoor patio 101i each include one playback device 110, and the master bedroom 101b and the den 101d include a plurality of playback devices 110. In the master bedroom 101b, the playback devices 110l and 110m may be configured, for example, to play back audio content in synchrony as individual ones of playback devices 110, as a bonded playback zone, as a consolidated playback device, and/or any combination thereof. Similarly, in the den 101d, the playback devices 110h-j can be configured, for instance, to play back audio content in synchrony as individual ones of playback devices 110, as one or more bonded playback devices, and/or as one or more consolidated playback devices. Additional details regarding bonded and consolidated playback devices are described below with respect to FIGS. 1B and 1M.

In some aspects, one or more of the playback zones in the environment 101 may each be playing different audio content. For instance, a user may be grilling on the patio 101i and listening to hip hop music being played by the playback device 110c while another user is preparing food in the kitchen 101h and listening to classical music played by the playback device 110b. In another example, a playback zone may play the same audio content in synchrony with another playback zone. For instance, the user may be in the office 101e listening to the playback device 110f playing back the same hip hop music being played back by playback device 110c on the patio 101i. In some aspects, the playback devices 110c and 110f play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
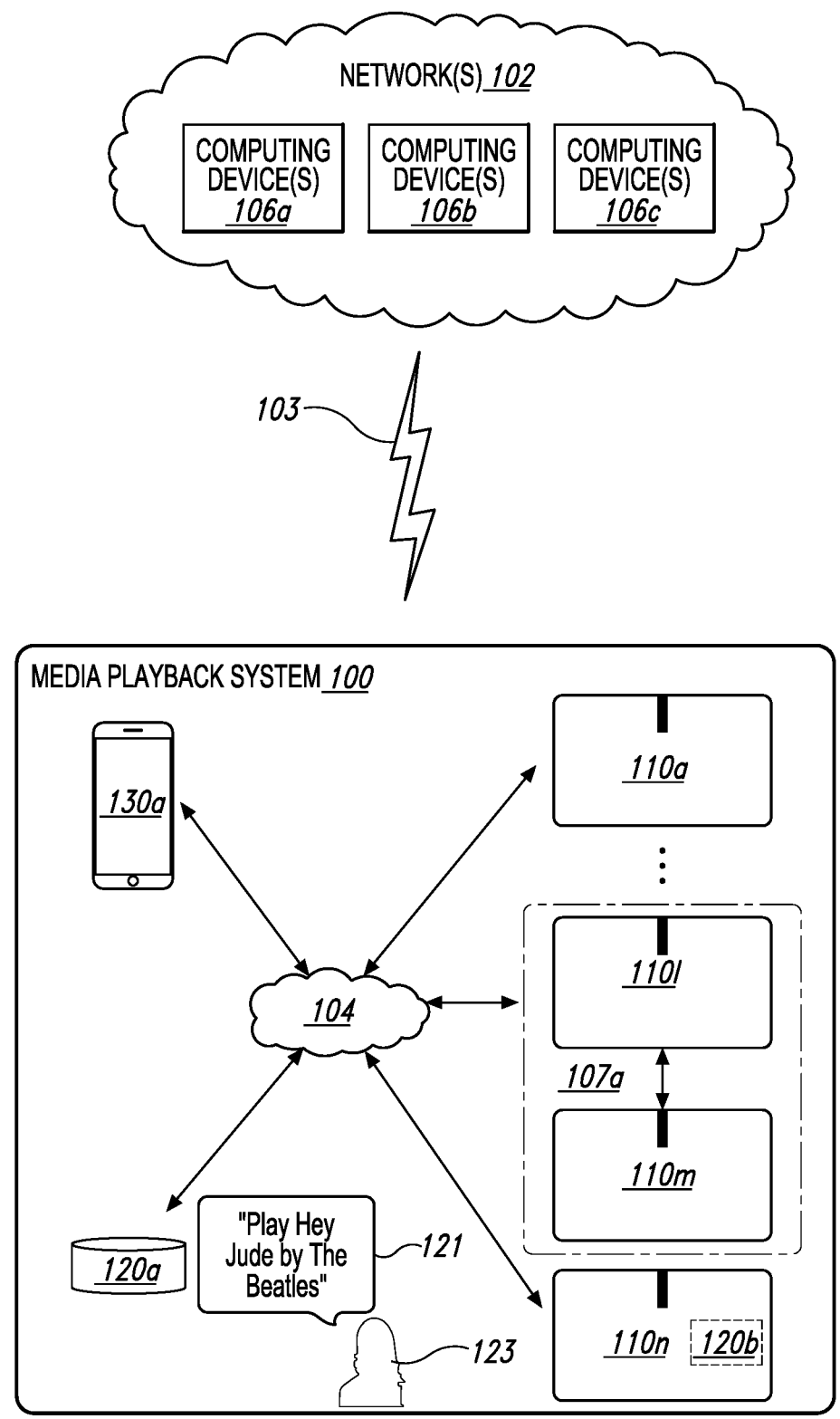
FIG. 1B is a schematic diagram of the media playback system of FIG. 1A and one or more networks, in accordance with an example.

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some embodiments, the cloud network 102 is further configured to receive data (e.g., voice input data) from the media playback system 100 and correspondingly transmit commands and/or media content to the media playback system 100.

The cloud network 102 comprises computing devices 106 (identified separately as a first computing device 106a, a second computing device 106b, and a third computing device 106c). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments, the cloud network 102 comprises a plurality of cloud networks comprising communicatively coupled computing devices. Furthermore, while the cloud network 102 is shown in FIG. 1B as having three of the computing devices 106, in some embodiments, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.11n, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, 6 GHz, and/or another suitable frequency.

In some embodiments, the network 104 comprises a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 comprises an existing household communication network (e.g., a household WiFi network). In some embodiments, the links 103 and the network 104 comprise one or more of the same networks. In some aspects, for example, the links 103 and the network 104 comprise a telecommunication network (e.g., an LTE network, a 5G network). Moreover, in some embodiments, the media playback system 100 is implemented without the network 104, and devices comprising the media playback system 100 can communicate with each other, for example, via one or more direct connections, PANs, telecommunication networks, and/or other suitable communication links.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some embodiments, for example, the media content database is stored on one or more of the playback devices 110, network microphone devices 120, and/or control devices 130.

In the illustrated embodiment of FIG. 1B, the playback devices 110*l* and 110*m* comprise a group 107*a*. The playback devices 110*l* and 110*m* can be positioned in different rooms in a household and be grouped together in the group 107*a* on a temporary or permanent basis based on user input received at the control device 130*a* and/or another control device 130 in the media playback system 100. When arranged in the group 107*a*, the playback devices 110*l* and 110*m* can be configured to play back the same or similar audio content in synchrony from one or more audio content sources. In certain embodiments, for example, the group 107*a* comprises a bonded zone in which the playback devices 110*l* and 110*m* comprise left audio and right audio channels, respectively, of multi-channel audio content, thereby producing or enhancing a stereo effect of the audio content. In some embodiments, the group 107*a* includes additional playback devices 110. In other embodiments, however, the media playback system 100 omits the group 107*a* and/or other grouped arrangements of the playback devices 110. Additional details regarding groups and other arrangements of playback devices are described in further detail below with respect to FIGS. 1-I through IM.

The media playback system 100 includes the NMDs 120*a* and 120*d*, each comprising one or more microphones configured to receive voice utterances from a user. In the illustrated embodiment of FIG. 1B, the NMD 120*a* is a standalone device and the NMD 120*d* is integrated into the playback device 110*n*. The NMD 120*a*, for example, is configured to receive voice input 121 from a user 123. In some embodiments, the NMD 120*a* transmits data associated with the received voice input 121 to a voice assistant service (VAS) configured to (i) process the received voice input data and (ii) transmit a corresponding command to the media playback system 100. In some aspects, for example, the computing device 106*c* comprises one or more modules and/or servers of a VAS (e.g., a VAS operated by one or more of SONOS®, AMAZON®, GOOGLE® APPLE®, MICROSOFT®). The computing device 106*c* can receive the voice input data from the NMD 120*a* via the network 104 and the links 103. In response to receiving the voice input data, the computing device 106*c* processes the voice input data (i.e., "Play Hey Jude by The Beatles"), and determines that the processed voice input includes a command to play a song (e.g., "Hey Jude"). The computing device 106*c* accordingly transmits commands to the media playback system 100 to play back "Hey Jude" by the Beatles from a suitable media service (e.g., via one or more of the computing devices 106) on one or more of the playback devices 110.

b. Suitable Playback Devices

Figure 1C:
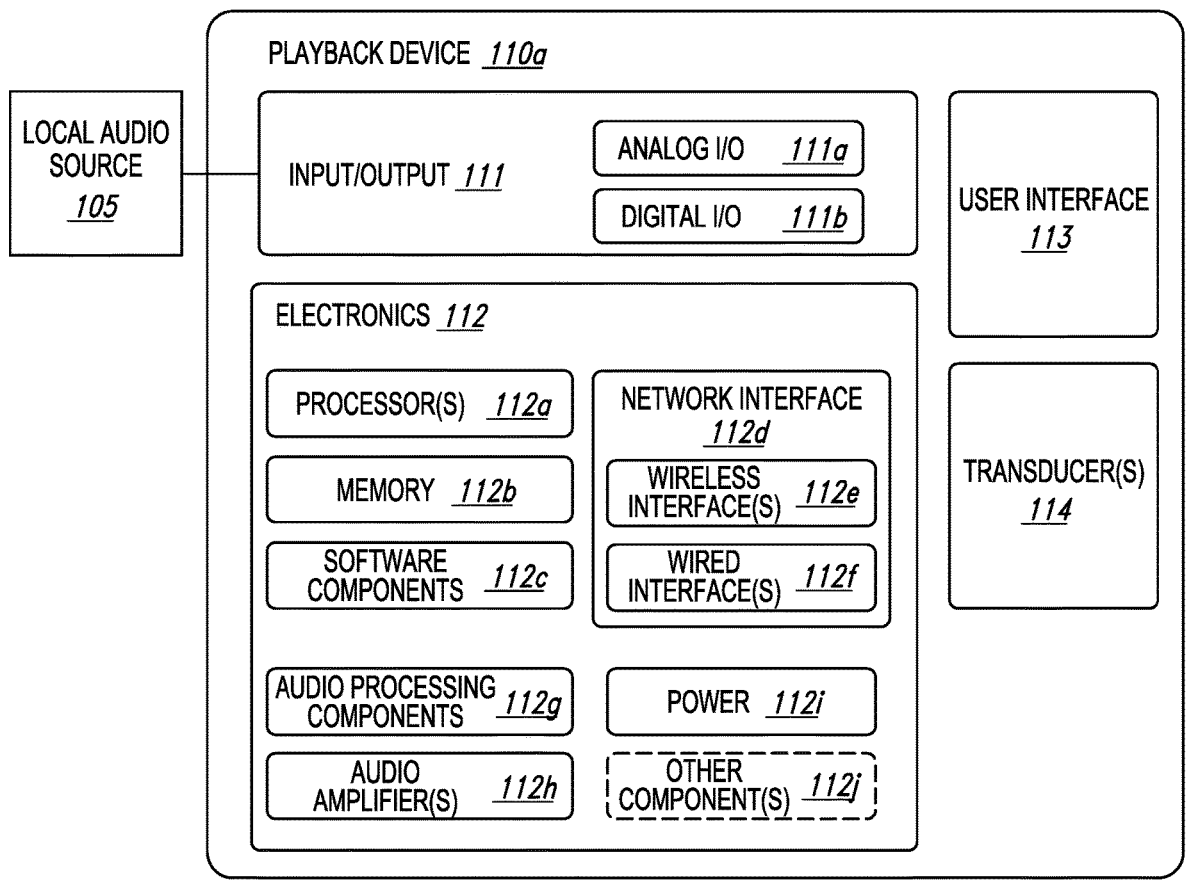
FIG. 1C is a block diagram of a playback device, in accordance with an example.

FIG. 1C is a block diagram of the playback device 110*a* comprising an input/output 111. The input/output 111 can include an analog I/O 111*a* (e.g., one or more wires, cables, and/or other suitable communication links configured to carry analog signals) and/or a digital I/O 111*b* (e.g., one or more wires, cables, or other suitable communication links configured to carry digital signals). In some embodiments, the analog I/O 111*a* is an audio line-in input connection comprising, for example, an auto-detecting 3.5 mm audio line-in connection. In some embodiments, the digital I/O 111*b* comprises a Sony/Philips Digital Interface Format (S/PDIF) communication interface and/or cable and/or a Toshiba Link (TOSLINK) cable. In some embodiments, the digital I/O 111*b* comprises a High-Definition Multimedia Interface (HDMI) interface and/or cable. In some embodiments, the digital I/O 111*b* includes one or more wireless communication links comprising, for example, a radio frequency (RF), infrared, WiFi, Bluetooth, or another suitable communication protocol. In certain embodiments, the analog I/O 111*a* and the digital 111*b* comprise interfaces (e.g., ports, plugs, jacks) configured to receive connectors of cables transmitting analog and digital signals, respectively, without necessarily including cables.

The playback device 110*a*, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 105 includes local music libraries on a smartphone, a computer, networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110*a* does not include an input/output 111 and receives all audio content via the network 104.

The playback device 110*a* further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 is configured to receive audio from an audio source (e.g., the local audio source 105) via the input/output 111, one or more of the computing devices 106*a-c* via the network 104 (FIG. 1B)), amplify the received audio, and output the amplified audio for playback via one or more of the transducers 114. In some embodiments, the playback device 110a optionally includes one or more microphones 115 (e.g., a single microphone, a plurality of microphones, a microphone array) (hereinafter referred to as "the microphones 115"). In certain embodiments, for example, the playback device 110a having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112a (referred to hereinafter as "the processors 112a"), memory 112b, software components 112c, a network interface 112d, one or more audio processing components 112g (referred to hereinafter as "the audio components 112g"), one or more audio amplifiers 112h (referred to hereinafter as "the amplifiers 112h"), and power 112i (e.g., one or more power supplies, power cables, power receptacles, batteries, induction coils, Power-over Ethernet (POE) interfaces, and/or other suitable sources of electric power). In some embodiments, the electronics 112 optionally include one or more other components 112j (e.g., one or more sensors, video displays, touchscreens, battery charging bases).

The processors 112a can comprise clock-driven computing component(s) configured to process data, and the memory 112b can comprise a computer-readable medium (e.g., a tangible, non-transitory computer-readable medium, data storage loaded with one or more of the software components 112c) configured to store instructions for performing various operations and/or functions. The processors 112a are configured to execute the instructions stored on the memory 112b to perform one or more of the operations. The operations can include, for example, causing the playback device 110a to retrieve audio data from an audio source (e.g., one or more of the computing devices 106a-c (FIG. 1B)), and/or another one of the playback devices 110. In some embodiments, the operations further include causing the playback device 110a to send audio data to another one of the playback devices 110a and/or another device (e.g., one of the NMDs 120). Certain embodiments include operations causing the playback device 110a to pair with another of the one or more playback devices 110 to enable a multi-channel audio environment (e.g., a stereo pair, a bonded zone).

The processors 112a can be further configured to perform operations causing the playback device 110a to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110a and the other one or more other playback devices 110. Additional details regarding audio playback synchronization among playback devices can be found, for example, in U.S. Pat. No. 8,234,395, which was incorporated by reference above.

In some embodiments, the memory 112b is further configured to store data associated with the playback device 110a, such as one or more zones and/or zone groups of which the playback device 110a is a member, audio sources accessible to the playback device 110a, and/or a playback queue that the playback device 110a (and/or another of the one or more playback devices) can be associated with. The stored data can comprise one or more state variables that are periodically updated and used to describe a state of the playback device 110a. The memory 112b can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112d is configured to facilitate transmission of data between the playback device 110a and one or more other devices on a data network such as, for example, the links 103 and/or the network 104 (FIG. 1B). The network interface 112d is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112d can parse the digital packet data such that the electronics 112 properly receives and processes the data destined for the playback device 110a.

In the illustrated embodiment of FIG. 1C, the network interface 112d comprises one or more wireless interfaces 112e (referred to hereinafter as "the wireless interface 112e"). The wireless interface 112e (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some embodiments, the network interface 112d optionally includes a wired interface 112f (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112d includes the wired interface 112f and excludes the wireless interface 112e. In some embodiments, the electronics 112 excludes the network interface 112d altogether and transmits and receives media content and/or other data via another communication path (e.g., the input/output 111).

The audio components 112g are configured to process and/or filter data comprising media content received by the electronics 112 (e.g., via the input/output 111 and/or the network interface 112d) to produce output audio signals. In some embodiments, the audio processing components 112g comprise, for example, one or more digital-to-analog converters (DAC), audio preprocessing components, audio enhancement components, digital signal processors (DSPs), and/or other suitable audio processing components, modules, circuits, etc. In certain embodiments, one or more of the audio processing components 112g can comprise one or more subcomponents of the processors 112a. In some embodiments, the electronics 112 omits the audio processing components 112g. In some aspects, for example, the processors 112a execute instructions stored on the memory 112b to perform audio processing operations to produce the output audio signals.

The amplifiers 112h are configured to receive and amplify the audio output signals produced by the audio processing components 112g and/or the processors 112a. The amplifiers 112h can comprise electronic devices and/or components configured to amplify audio signals to levels sufficient for driving one or more of the transducers 114. In some embodiments, for example, the amplifiers 112h include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112h comprise a suitable combination of two or more of the foregoing types of power amplifiers.

Moreover, in some embodiments, individual ones of the amplifiers 112h correspond to individual ones of the transducers 114. In other embodiments, however, the electronics 112 includes a single one of the amplifiers 112h configured to output amplified audio signals to a plurality of the transducers 114. In some other embodiments, the electronics 112 omits the amplifiers 112h.

The transducers 114 (e.g., one or more speakers and/or speaker drivers) receive the amplified audio signals from the amplifier 112h and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low-frequency transducers (e.g., subwoofers, woofers), mid-range frequency transducers (e.g., mid-range transducers, mid-woofers), and one or more high-frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

Figure 1D:
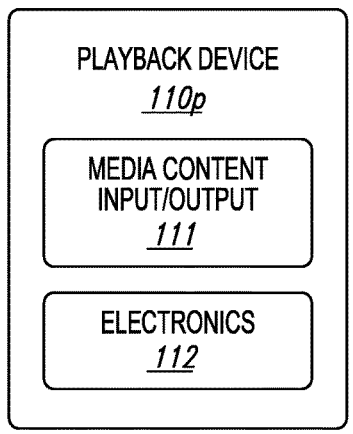
FIG. 1D is a block diagram of a playback device, in accordance with an example.

By way of illustration, SONOS, Inc. presently offers (or has offered) for sale certain playback devices including, for example, a "SONOS ONE," "PLAY:1," "PLAY:3," "PLAY:5," "PLAYBAR," "PLAYBASE," "CONNECT:AMP," "CONNECT," and "SUB." Other suitable playback devices may additionally or alternatively be used to implement the playback devices of example embodiments disclosed herein. Additionally, one of ordinary skilled in the art will appreciate that a playback device is not limited to the examples described herein or to SONOS product offerings. In some embodiments, for example, one or more playback devices 110 comprises wired or wireless headphones (e.g., over-the-ear headphones, on-ear headphones, in-ear earphones). In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110p comprising the input/output 111 and electronics 112 without the user interface 113 or transducers 114.

Figure 1E:
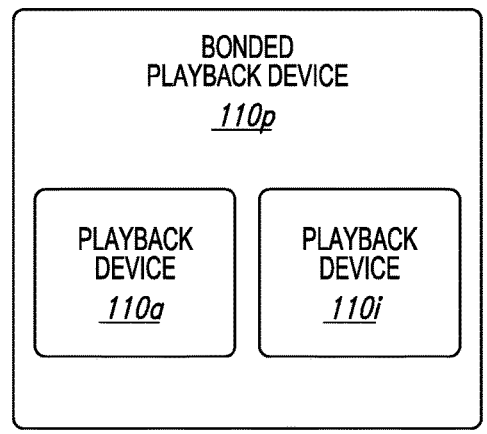
FIG. 1E is a block diagram of a network microphone device, in accordance with an example.

FIG. 1E is a block diagram of a bonded playback device 110q comprising the playback device 110a (FIG. 1C) sonically bonded with the playback device 110i (e.g., a subwoofer) (FIG. 1A). In the illustrated embodiment, the playback devices 110a and 110i are separate ones of the playback devices 110 housed in separate enclosures. In some embodiments, however, the bonded playback device 110q comprises a single enclosure housing both the playback devices 110a and 110i. The bonded playback device 110q can be configured to process and reproduce sound differently than an unbonded playback device (e.g., the playback device 110a of FIG. 1C) and/or paired or bonded playback devices (e.g., the playback devices 110l and 110m of FIG. 1B). In some embodiments, for example, the playback device 110a is a full-range playback device configured to render low frequency, mid-range frequency, and high-frequency audio content, and the playback device 110i is a subwoofer configured to render low-frequency audio content. In some aspects, the playback device 110a, when bonded with the first playback device, is configured to render only the mid-range and high-frequency components of particular audio content, while the playback device 110i renders the low-frequency component of the particular audio content. In some embodiments, the bonded playback device 110q includes additional playback devices and/or another bonded playback device.

c. Suitable Network Microphone Devices (NMDs)

FIG. 1F is a block diagram of the NMD 120a (FIGS. 1A and 1B). The NMD 120a includes one or more voice processing components 124 (hereinafter "the voice components 124") and several components described with respect to the playback device 110a (FIG. 1C) including the processors 112a, the memory 112b, and the microphones 115. The NMD 120a optionally comprises other components also included in the playback device 110a (FIG. 1C), such as the user interface 113 and/or the transducers 114. In some embodiments, the NMD 120a is configured as a media playback device (e.g., one or more of the playback devices 110), and further includes, for example, one or more of the audio components 112g (FIG. 1C), the amplifiers 114, and/or other playback device components. In certain embodiments, the NMD 120a comprises an Internet of Things (IoT) device such as, for example, a thermostat, alarm panel, fire and/or smoke detector, etc. In some embodiments, the NMD 120a comprises the microphones 115, the voice processing 124, and only a portion of the components of the electronics 112 described above with respect to FIG. 1B. In some aspects, for example, the NMD 120a includes the processor 112a and the memory 112b (FIG. 1B), while omitting one or more other components of the electronics 112. In some embodiments, the NMD 120a includes additional components (e.g., one or more sensors, cameras, thermometers, barometers, hygrometers).

In some embodiments, an NMD can be integrated into a playback device. FIG. 1G is a block diagram of a playback device 110r comprising an NMD 120d. The playback device 110r can comprise many or all of the components of the playback device 110a and further include the microphones 115 and voice processing 124 (FIG. 1F). The playback device 110r optionally includes an integrated control device 130c. The control device 130c can comprise, for example, a user interface (e.g., the user interface 113 of FIG. 1B) configured to receive user input (e.g., touch input, voice input) without a separate control device. In other embodiments, however, the playback device 110r receives commands from another control device (e.g., the control device 130a of FIG. 1B).

Referring again to FIG. 1F, the microphones 115 are configured to acquire, capture, and/or receive sound from an environment (e.g., the environment 101 of FIG. 1A) and/or a room in which the NMD 120a is positioned. The received sound can include, for example, vocal utterances, audio played back by the NMD 120a and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home.

d. Suitable Control Devices

FIG. 1H is a partially schematic diagram of the control device 130a (FIGS. 1A and 1B). As used herein, the term "control device" can be used interchangeably with "controller" or "control system." Among other features, the control device 130a is configured to receive user input related to the media playback system 100 and, in response, cause one or more devices in the media playback system 100 to perform an action(s) or operation(s) corresponding to the user input. In the illustrated embodiment, the control device 130a comprises a smartphone (e.g., an iPhone™, an Android phone) on which media playback system controller application software is installed. In some embodiments, the control device 130a comprises, for example, a tablet (e.g., an iPad™), a computer (e.g., a laptop computer, a desktop computer), and/or another suitable device (e.g., a television, an automobile audio head unit, an IoT device). In certain embodiments, the control device 130a comprises a dedicated controller for the media playback system 100. In other embodiments, as described above with respect to FIG. 1G, the control device 130a is integrated into another device in the media playback system 100 (e.g., one more of the playback devices 110, NMDs 120, and/or other suitable devices configured to communicate over a network).

The control device 130a includes electronics 132, a user interface 133, one or more speakers 134, and one or more microphones 135. The electronics 132 comprise one or more processors 132a (referred to hereinafter as "the processors 132a"), a memory 132b, software components 132c, and a network interface 132d. The processor 132a can be configured to perform functions relevant to facilitating user access, control, and configuration of the media playback system 100. The memory 132b can comprise data storage that can be loaded with one or more of the software components executable by the processor 302 to perform those functions. The software components 132c can comprise applications and/or other executable software configured to facilitate control of the media playback system 100. The memory 112b can be configured to store, for example, the software components 132c, media playback system controller application software, and/or other data associated with the media playback system 100 and the user.

The network interface 132d is configured to facilitate network communications between the control device 130a and one or more other devices in the media playback system 100, and/or one or more remote devices. In some embodiments, the network interface 132 is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132d can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone, and/or zone group configurations. For instance, based on user input received at the user interface 133, the network interface 132d can transmit a playback device control command (e.g., volume control, audio playback control, audio content selection) from the control device 130 to one or more of the playback devices 100. The network interface 132d can also transmit and/or receive configuration changes such as, for example, adding/removing one or more playback devices 100 to/from a zone, adding/removing one or more zones to/from a zone group, forming a bonded or consolidated player, separating one or more playback devices from a bonded or consolidated player, among others. Additional description of zones and groups can be found below with respect to FIGS. 1I through 1M.

The user interface 133 is configured to receive user input and can facilitate 'control of the media playback system 100. The user interface 133 includes media content art 133a (e.g., album art, lyrics, videos), a playback status indicator 133b (e.g., an elapsed and/or remaining time indicator), media content information region 133c, a playback control region 133d, and a zone indicator 133e. The media content information region 133c can include a display of relevant information (e.g., title, artist, album, genre, release year) about media content currently playing and/or media content in a queue or playlist. The playback control region 133d can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit crossfade mode, etc. The playback control region 133d may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130a. In some embodiments, the one or more speakers comprise individual transducers configured to correspondingly output low frequencies, mid-range frequencies, and/or high frequencies. In some aspects, for example, the control device 130a is configured as a playback device (e.g., one of the playback devices 110). Similarly, in some embodiments, the control device 130a is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130a is configured to operate as a playback device and an NMD. In other embodiments, however, the control device 130a omits the one or more speakers 134 and/or the one or more microphones 135. For instance, the control device 130a may comprise a device (e.g., a thermostat, an IoT device, a network device) comprising a portion of the electronics 132 and the user interface 133 (e.g., a touch screen) without any speakers or microphones.

e. Suitable Playback Device Configurations

FIGS. 1-I through 1M show example configurations of playback devices in zones and zone groups. Referring first to FIG. 1M, in one example, a single playback device may belong to a zone. For example, the playback device 110g in the second bedroom 101c (FIG. 1A) may belong to Zone C. In some implementations described below, multiple playback devices may be "bonded" to form a "bonded pair" which together form a single zone. For example, the playback device 110l (e.g., a left playback device) can be bonded to the playback device 110l (e.g., a left playback device) to form Zone A. Bonded playback devices may have different playback responsibilities (e.g., channel responsibilities). In another implementation described below, multiple playback devices may be merged to form a single zone. For example, the playback device 110h (e.g., a front playback device) may be merged with the playback device 110i (e.g., a subwoofer), and the playback devices 110j and 110k (e.g., left and right surround speakers, respectively) to form a single Zone D. In another example, the playback devices 110g and 110h can be merged to form a merged group or a zone group 108b. The merged playback devices 110g and 110h may not be specifically assigned different playback responsibilities. That is, the merged playback devices 110h and 110i may, aside from playing audio content in synchrony, each play audio content as they would if they were not merged.

Each zone in the media playback system 100 may be provided for control as a single user interface (UI) entity. For example, Zone A may be provided as a single entity named Master Bathroom. Zone B may be provided as a single entity named Master Bedroom. Zone C may be provided as a single entity named Second Bedroom.

Playback devices that are bonded may have different playback responsibilities, such as responsibilities for certain audio channels. For example, as shown in FIG. 1-I, the playback devices 110l and 110m may be bonded to produce or enhance a stereo effect of audio content. In this example, the playback device 110l may be configured to play a left channel audio component, while the playback device 110k may be configured to play a right channel audio component. In some implementations, such stereo bonding may be referred to as "pairing."

Figure 1M:
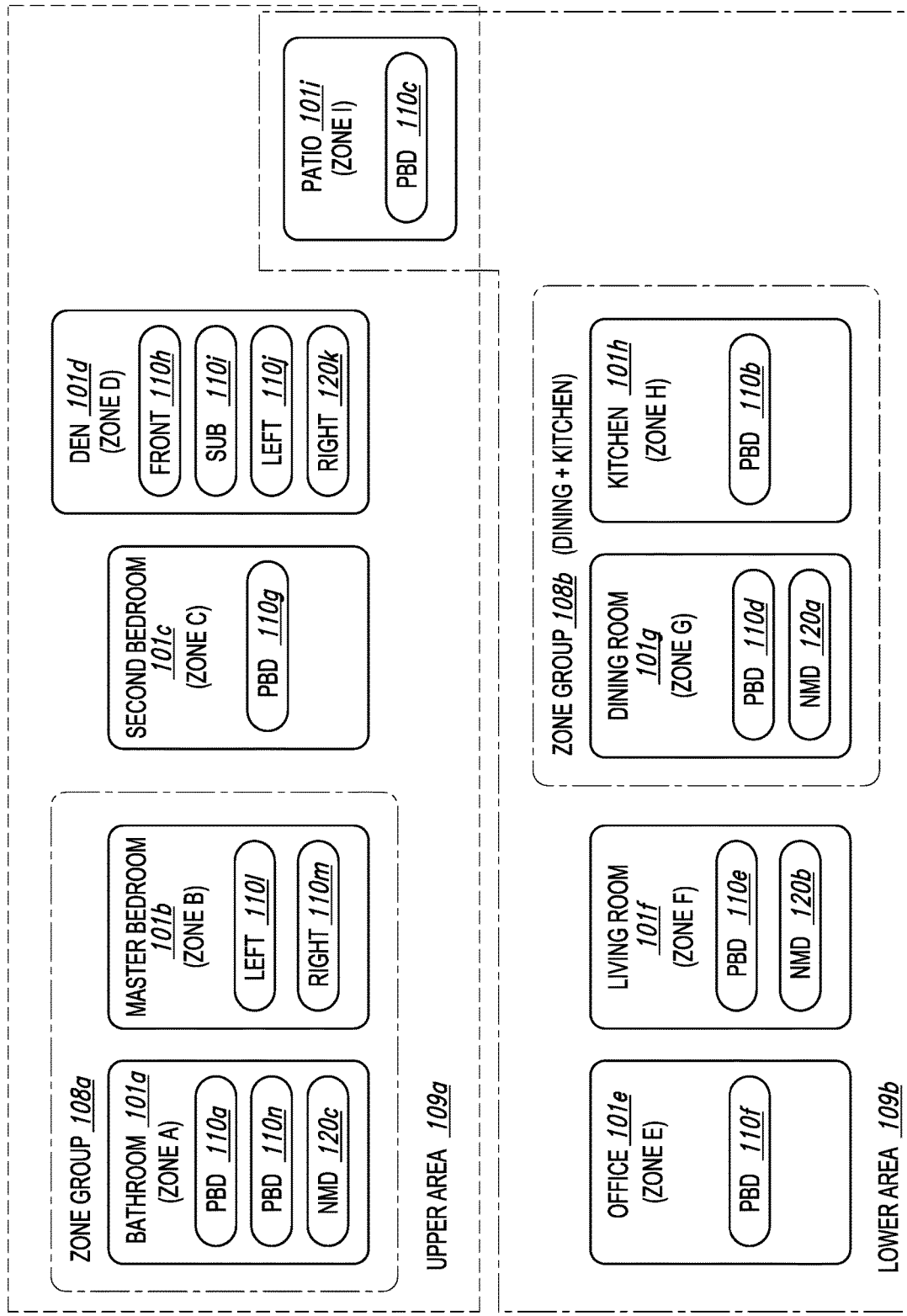
FIG. 1M is a schematic diagram of media playback system areas, in accordance with an example.

Additionally, bonded playback devices may have additional and/or different respective speaker drivers. As shown in FIG. 1J, the playback device 110h named Front may be bonded with the playback device 110i named SUB. The Front device 110h can be configured to render a range of mid to high frequencies, and the SUB device 110i can be configured to render low frequencies. When unbonded, however, the Front device 110h can be configured to render a full range of frequencies. As another example, FIG. 1K shows the Front and SUB devices 110h and 110i further bonded with Left and Right playback devices 110j and 110k, respectively. In some implementations, the Right and Left devices 110j and 102k can be configured to form surround or "satellite" channels of a home theater system. The bonded playback devices 110h, 110i, 110j, and 110k may form a single Zone D (FIG. 1M).

Playback devices that are merged may not have assigned playback responsibilities, and may each render the full range of audio content the respective playback device is capable of. Nevertheless, merged devices may be represented as a single UI entity (i.e., a zone, as discussed above). For instance, the playback devices 110a and 110n the master bathroom have the single UI entity of Zone A. In one embodiment, the playback devices 110a and 110n may each output the full range of audio content each respective playback devices 110a and 110n are capable of, in synchrony.

In some embodiments, an NMD is bonded or merged with another device so as to form a zone. For example, the NMD 120b may be bonded with the playback device 110e, which together form Zone F, named Living Room. In other embodiments, a stand-alone network microphone device may be in a zone by itself. In other embodiments, however, a stand-alone network microphone device may not be associated with a zone. Additional details regarding associating network microphone devices and playback devices as designated or default devices may be found, for example, in previously referenced U.S. patent application Ser. No. 15/438,749.

Zones of individual, bonded, and/or merged devices may be grouped to form a zone group. For example, referring to FIG. 1M, Zone A may be grouped with Zone B to form a zone group 108a that includes the two zones. Similarly, Zone G may be grouped with Zone H to form the zone group 108b. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Playback devices may be dynamically grouped and ungrouped to form new or different groups that synchronously play back audio content.

In various implementations, the zones in an environment may be the default name of a zone within the group or a combination of the names of the zones within a zone group. For example, Zone Group 108b can have be assigned a name such as "Dining+Kitchen", as shown in FIG. 1M. In some embodiments, a zone group may be given a unique name selected by a user.

Certain data may be stored in a memory of a playback device (e.g., the memory 112c of FIG. 1C) as one or more state variables that are periodically updated and used to describe the state of a playback zone, the playback device(s), and/or a zone group associated therewith. The memory may also include the data associated with the state of the other devices of the media system, and shared from time to time among the devices so that one or more of the devices have the most recent data associated with the system.

In some embodiments, the memory may store instances of various variable types associated with the states. Variables instances may be stored with identifiers (e.g., tags) corresponding to a type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, identifiers associated with the second bedroom 101c may indicate that the playback device is the only playback device of the Zone C and not in a zone group. Identifiers associated with the Den may indicate that the Den is not grouped with other zones but includes bonded playback devices 110h-110k. Identifiers associated with the Dining Room may indicate that the Dining Room is part of the Dining+Kitchen zone group 108b and that devices 110b and 110d are grouped (FIG. 1L). Identifiers associated with the Kitchen may indicate the same or similar information by virtue of the Kitchen being part of the Dining+Kitchen zone group 108b. Other example zone variables and identifiers are described below.

In yet another example, the media playback system 100 may store variables or identifiers representing other associations of zones and zone groups, such as identifiers associated with Areas, as shown in FIG. 1M. An area may involve a cluster of zone groups and/or zones not within a zone group. For instance, FIG. 1M shows an Upper Area 109a including Zones A-D, and a Lower Area 109b including Zones E-I. In one aspect, an Area may be used to invoke a cluster of zone groups and/or zones that share one or more zones and/or zone groups of another cluster. In another aspect, this differs from a zone group, which does not share a zone with another zone group.

Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the media playback system 100 may not implement Areas, in which case the system may not store variables associated with Areas.

III. Example Techniques for Reducing Latency in a Wireless Home Theater Environment As noted above, playback devices that are bonded may have different playback responsibilities, such as responsibilities for certain audio channels. For example, as illustrated in FIG. 1K, in a home theater environment, the Front and SUB devices 110h and 110i can be bonded with Left and Right playback devices 110j and 110k, respectively. Further, in some implementations, the Right and Left devices 110j and 102k can be configured to form surround or "satellite" channels of a home theater system. The bonded playback devices 110h, 110i, 110j, and 110k may form a single Zone D (FIG. 1M).

Figure 2:
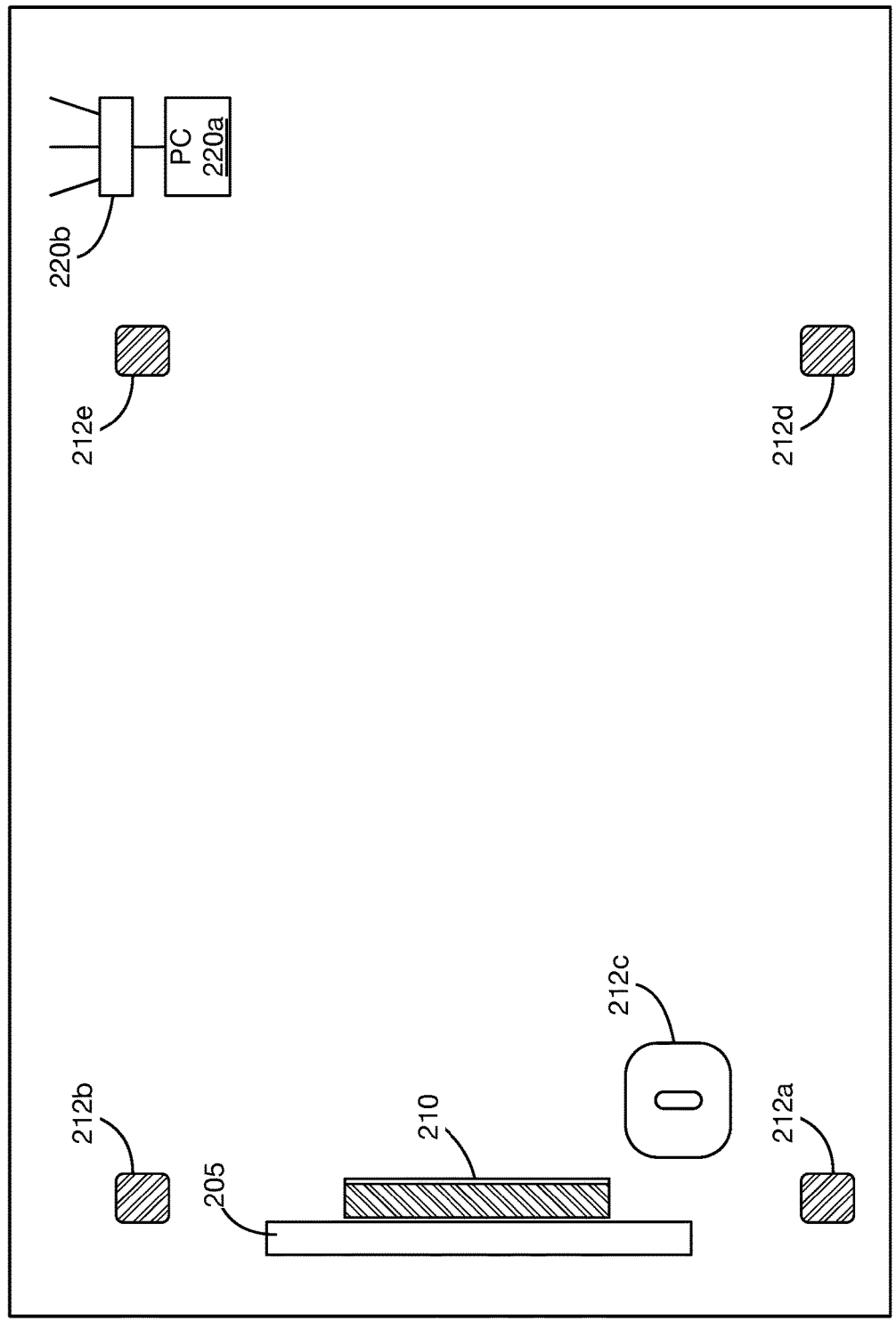
FIG. 2 illustrates an example of a home theater environment, in accordance with an example.

FIG. 2 illustrates an example of a home theater environment 200. Shown in FIG. 2 are a television 205 and a Front playback device 210, hereinafter referred to as the master playback device (MPD). Other playback devices of the environment 200 include a Front Left playback device 212a, a Front Right playback device 212b, a Subwoofer playback device 212c, a Rear Left playback device 212d, and a Rear Right playback device 212e. The other playback devices are hereinafter collectively referred to as satellite playback devices (SPDs) 212. Other devices of the environment 200 can include a personal computer (PC) 220a and a wireless network router 220b.

In the illustrated example, the MPD 210 receives audio content from the television 205. For example, the MPD 210 can be positioned near the television 205 and directed to a viewer who can be centrally positioned between the respective playback devices. The MPD 210 and the television 205 can include analog and/or digital interfaces that facilitate communicating the multi-channel audio content such as a SPDIF RCA interface, an HDMI interface (e.g., audio return channel (ARC) HDMI interface), an optical interface (e.g., TOSLINK interface), etc. In some examples, the MPD 210 and the television 205 can include wireless circuitry that facilitates communicating the audio content. For example, the audio content can be communicated via 802.11, BLUETOOTH, ZIGBEE, Z-WAVE, etc. The audio content can be associated with video content displayed on the television 205.

The MPD 210 can wirelessly communicate/transmit different channels of the audio content (i.e., front-left channel, front-right channel, subwoofer channel, rear-left channel, and rear-right channel) to the SPDs 212. An example of the MPD 210 can communicate with the SPDs 212 of the environment 200 over one or more channels (e.g., one or more 20 Mhz channels) of a 2.4 GHz spectrum, a 5 GHz spectrum, and/or a 6 GHz spectrum. Wireless communications performed within these spectrums can be subject to certain regulations such as those specified by the Federal Communications Commission (FCC) in the United States and/or other regulatory bodies.

Figure 3A:
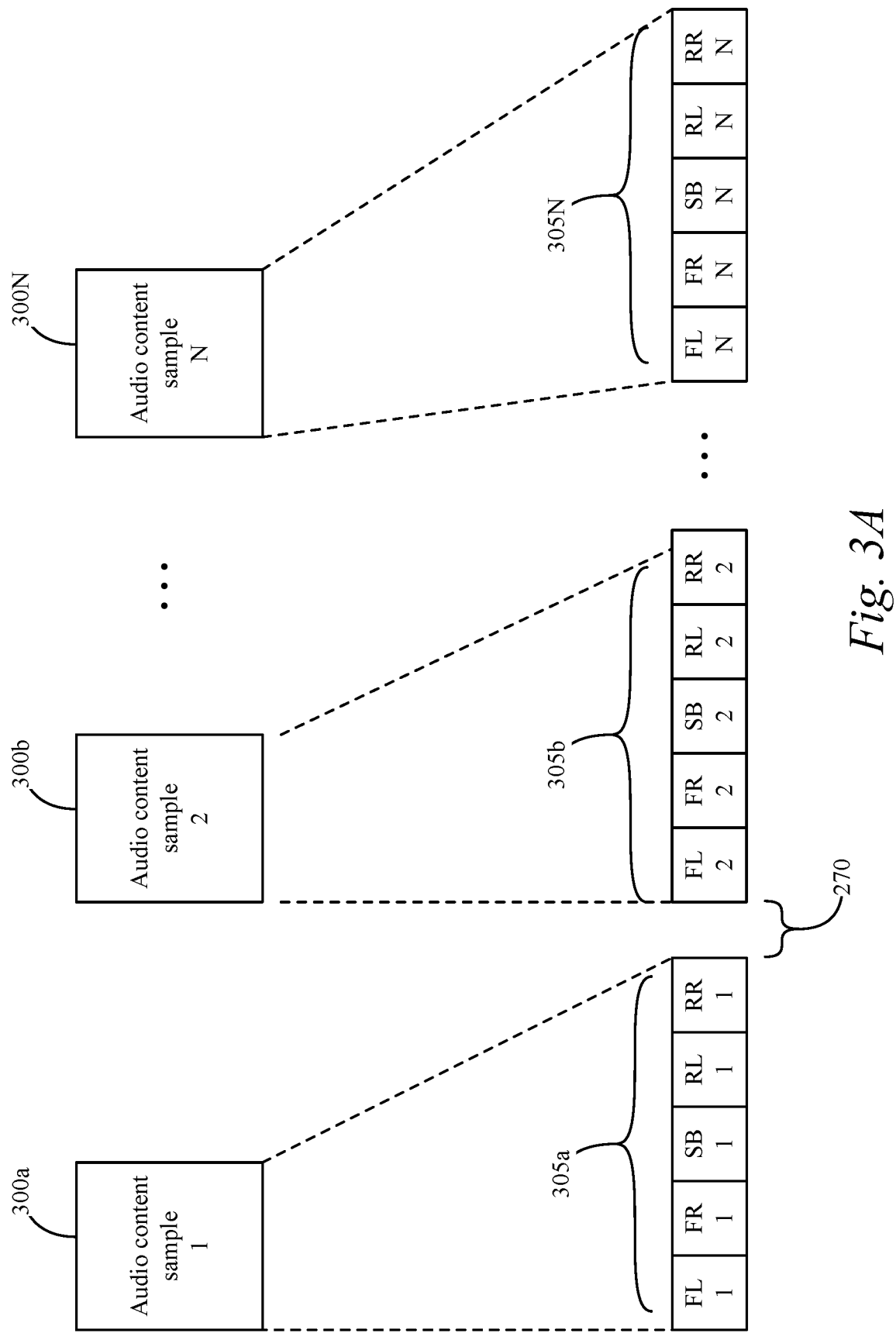
FIGS. 3A and 3B each illustrate an example methodology that can be utilized by a master playback device (MPD) of the home theater environment to communicate audio content to a satellite playback device (SPD) of the home theater environment, in accordance with an example.

FIG. 3A illustrates an example of a methodology that can be utilized by the MPD 210 to communicate audio content to the SPDs 212. Referring to FIG. 3A, the MPD 210 can utilize so-called "Round Robin" scheduling to communicate the audio content to the SPDs 212. For example, the MPD 210 can receive a stream of audio content samples (300a, 300b, . . . 300N) from the television 205. The audio content samples 300 can be communicated from the television 205 at any of a variety of rates including, for example, 44.1 kilohertz (kHz), 48 kHz, 96 kHz, 176.2 kHz, and 192 kHz. The audio content samples 300 may comprise uncompressed audio content (e.g., Pulse-Code Modulation (PCM) audio) and/or compressed audio content (e.g., DOLBY audio such as DOLBY AC-3 audio, DOLBY E-AC-3 audio, DOLBY AC-4 audio, and DOLBY ATMOS audio). The television 205 outputs the audio content samples 300 while beginning the process of rendering the video content on a display (e.g., integrated into the television 205). Given that the television 205 may take tens of milliseconds to successfully render the video content, the audio content samples 300 may be output before the corresponding video content is displayed (e.g., tens of milliseconds earlier). The MPD 210 may coordinate playback of the audio content samples 300 in lip-synchrony with the video content being displayed on the television 205 such that there is no perceived audio delay (i.e., no lip-syncing issues are perceived) by the viewer. In this regard, it can be shown that in some cases, a delay of no more than 40 ms between the video content being rendered and the audio content being heard is imperceptible to the average viewer. The MPD 210 may achieve lip-synchrony by, for example, exploiting one or more of the following periods of time: (1) a gap between the television 205 outputting the audio content samples 300 and television 205 actually displaying the associated video content; and/or (2) an allowable delay between the video content being displayed and the associated audio content being played back without losing lip-synchrony (e.g., up to 40 milliseconds).

After receiving a particular audio content sample 300a, the MPD 210 can extract the channel samples 305a (i.e., front-left, front-right, etc.) from the audio content sample 300a and can communicate the channel samples 305a to the corresponding SPDs 212. In the illustrated examples in FIG. 3A, the channel samples 305a are communicated sequentially. For example, during a first interval, the MPD 210 can communicate the front-left channel sample (FL1) associated with a first audio content sample 300a to the Front Left Playback device 212a. During a second interval, the MPD 210 can communicate the front-right channel sample (FR1) associated with the first audio content sample 300a to the Front Right Playback device 212b. During a third interval, the MPD 210 can communicate the subwoofer channel sample (SB1) associated with the first audio content sample 300a to the subwoofer playback device 212c. During a fourth interval, the MPD 210 can communicate the rear-left channel sample (RL1) associated with the first audio content sample 300a to the rear left playback device 212d. During a fourth interval, the MPD 210 can communicate the rear-right channel sample (RR1) associated with the first audio content sample 300a to the rear right playback device 212e. The same process can repeat with the arrival of subsequent audio content samples from the television 205, such as audio content sample 300b through audio content sample 300N.

It should be appreciated that, in some examples, more than one of the channel samples 305a may be simultaneously communicated to the SPDs 212. Simultaneous communication of audio content from the MPD 210 to the SPDs 212 may be accomplished in any of a variety of ways. For example, certain wireless communication standards (e.g., 802.11ax) include orthogonal frequency-division multiple access (OFDMA) support that enables a given wireless channel to be sub-divided into multiple smaller sub-channels. Each of these sub-channels may be employed to communicate with different devices independently from each other. In examples where the MPD 210 (and associated SPDs 212) support such a wireless communication standard, the MPD 210 may simultaneously transmit audio samples to a first SPD over a first sub-channel and transmit audio samples to a second SPD over a second sub-channel within the same channel as the first sub-channel. In other examples, the MPD 210 may communicate with the SPDs 212 using multiple RF channels. For example, the channel samples 305a for a first subset of the SPDs 212 can be communicated via a first RF channel and the channel samples 305a for a second subset of the SPDs can be communicated via a second RF channel that is different from the first RF channel (e.g., a different channel in the same spectrum as the first RF channel or a different channel in a different spectrum than the first RF channel).

Figure 3B:
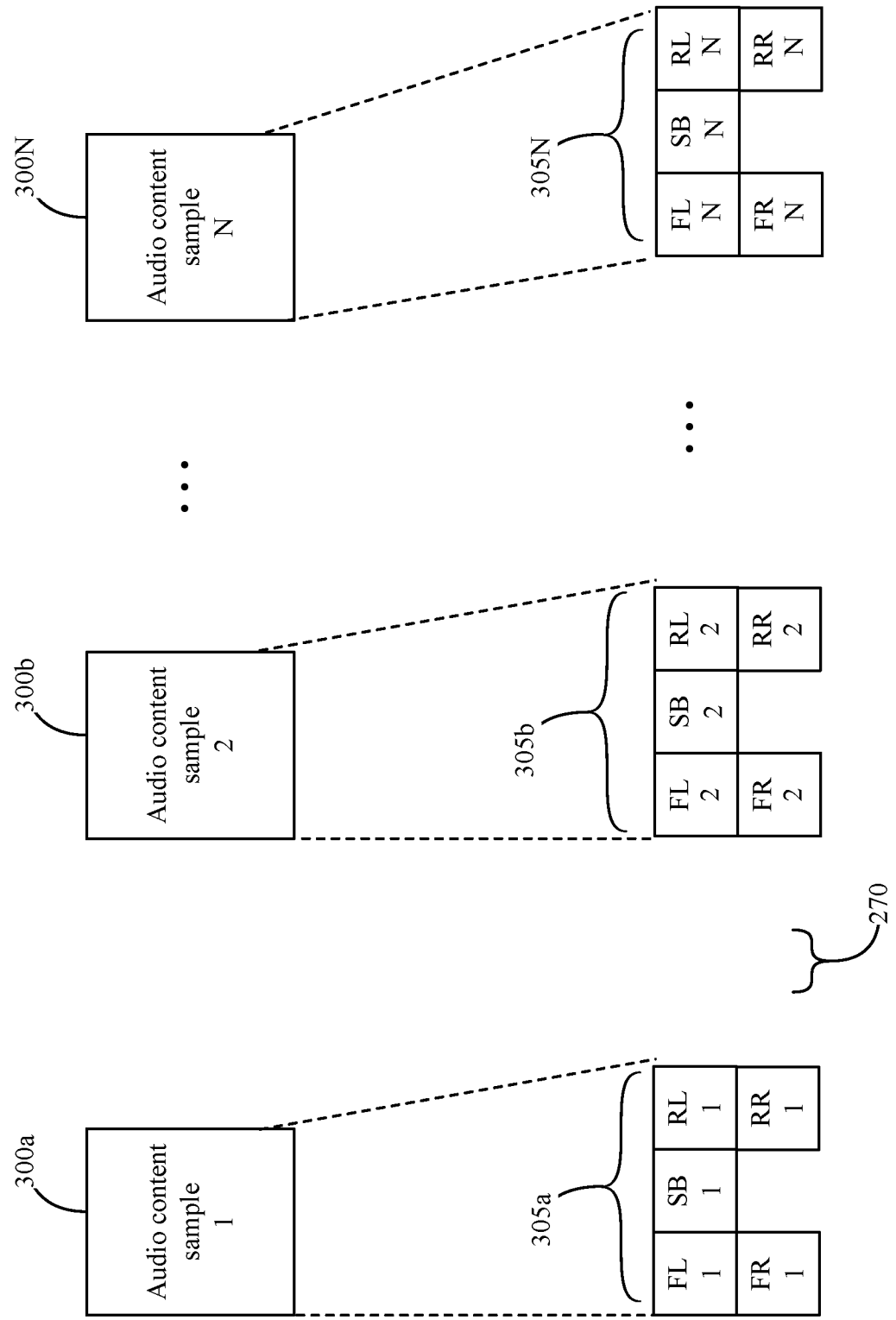

FIG. 3B illustrates an example of a methodology that can be utilized by the MPD 210 to communicate audio content to the SPDs 212 that leverages the simultaneous communication capabilities described above. As shown, multiple channel samples may be transmitted simultaneously to different playback devices. For example, during a first interval, the MPD 210 can communicate both the front-left channel sample (FL1) associated with a first audio content sample 300a to the Front Left Playback device 212a and the front-right channel sample (FR1) associated with the first audio content sample 300a to the Front Right Playback device 212b. During a second interval, the MPD 210 can communicate the subwoofer channel sample (SB1) associated with the first audio content sample 300a to the subwoofer playback device 212c. During a third interval, the MPD 210 can communicate both the rear-left channel sample (RL1) associated with the first audio content sample 300a to the rear left playback device 212d and the rear-right channel sample (RR1) associated with the first audio content sample 300a to the rear right playback device 212e. The same process can repeat with the arrival of subsequent audio content samples from the television 205, such as audio content sample 300b through audio content sample 300N.

It should be appreciated that the order in which the particular channel samples 305a are transmitted and the way in which the particular channel samples 305a are grouped for simultaneous transmission may vary based on the particular implementation. For example, the rear-left channel sample (RL1) and/or the rear-right channel sample (RR1) may be transmitted before the front-left channel sample (FL1) and/or the front-right channel sample (FR1). Additionally (or alternatively), the rear-left channel sample (RL1) may be transmitted simultaneously with the front-left channel sample (FL1) and/or the front-right channel sample (FR1). Thus, the particular channel samples 305a may be ordered and/or grouped in any of a variety of ways.

It should be noted that the amount of time required to communicate the channel samples 305 associated with a particular audio content sample 300 can depend on the number of channels encoded in the audio content sample 300 and/or the number of channels to be decoded from the audio content sample for playback by SPDs 212. For example, the total amount of time required to communicate the channel samples 305 may increase as the total number of channels increases. This increase in the total amount of time required to communicate the channel samples 305 can become problematic in home theater systems attempting to maintain lip-synchrony with video content being played back on the television 205. For example, the total amount of time required to communicate the requisite channel samples 305 for audio content with a large number of audio channels (e.g., DOLBY ATMOS audio content) may be longer (e.g., in certain noisy environments) than the available time window to render audio output in lip-synchrony.

As noted above, an example of the MPD 210 can communicate with the SPDs 212 of the environment 200 via a 2.4 GHz spectrum, a 5 GHz spectrum, and/or a 6 GHz spectrum. And, as noted above, an example home theater environment 200 can include other devices such as computers 220a and wireless network routers 220b that can, in some cases, communicate within the same spectrums. When this occurs, network traffic generated by the other devices 220 can interfere with the communications between the MPD 210 and the SPDs 212. Those home theater environments 200 that are in densely populated areas (e.g., in apartment complexes and/or in urban environments) also may have interference from wireless devices of nearby inhabitants (e.g., the wireless router of a neighbor, etc.). The interference can, in some cases, delay the communication of the channel samples to the SPDs 212. And if the delay is severe enough, the MPD 210 may be unable to successfully transmit the audio content samples 300 to the SPDs 212 fast enough to maintain lip-synchrony. The interference can be mitigated to an extent by monitoring the interference on multiple spectrums (e.g., two or more of: a 2.4 GHz spectrum, a 5 GHz spectrum, and a 6 GHz spectrum) and/or multiple channels (e.g., multiple channels on the 2.4 GHz spectrum, multiple channels on the 5 GHz spectrum, multiple channels on the 6 GHz spectrum, or a combination thereof) and communicating the channel samples via the spectrum and/or channels with the highest connection quality (e.g., least interference, strongest signal strength, etc.). However, the best channel and/or spectrum in particularly noise environments may still not be of sufficient quality to maintain lip-synchony.

Figure 4:
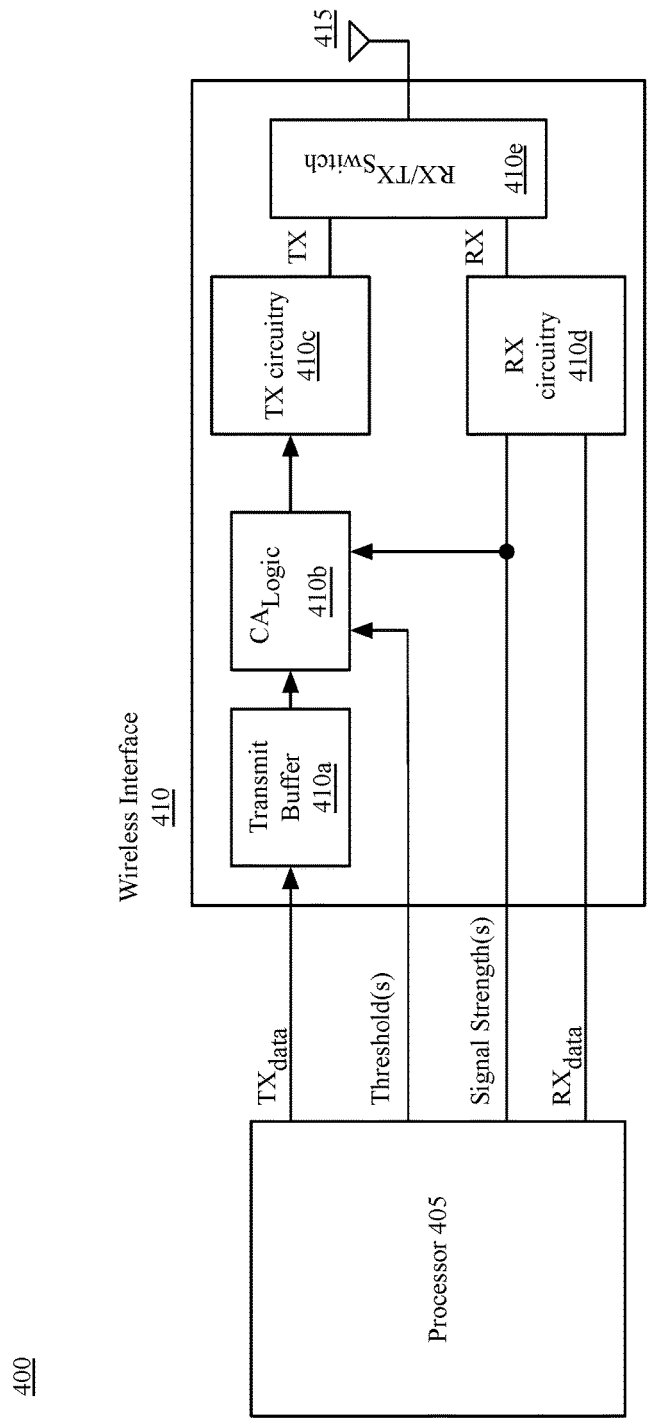
FIG. 4 illustrates a logical diagram of circuitry of the MPD that can mitigate issues that can occur due to wireless interference, in accordance with an example.

FIG. 4 illustrates an example of a logical diagram of circuitry 400 of the MPD 210 that can further mitigate interference related issues. For example, the circuitry 400 can communicate audio content via the SPDs 212 so that delay between the rendered video and the audio output from the SPDs is less than 40 ms. In some examples, the delay can be less than 20 ms. In yet other examples, the delay can be less than 5 ms. Referring to FIG. 4, the circuitry 400 includes a processor 405, a wireless interface 410, and an antenna 415. The processor 405 can correspond to or include the capabilities of the processor 112a described above. The wireless interface 410 can correspond to or include the capabilities of the wireless interface 112e described above.

An example of the wireless interface 410 can include a transmit buffer 410a, Collision Avoidance (CA) logic 410b, transmitter (TX) circuitry 410c, receiver (RX) circuitry 410d, and an RX/TX switch 410e.

The transmit buffer 410a can correspond to memory configured to store TX data. For example, the transmit buffer 410a can be sized to store one or more audio content samples 300. The transmit buffer 410a can receive TX data from the processor 405, which can be in communication and upstream of the transmit buffer 410a. The transmit buffer 410a can communicate the TX data to the TX circuitry 410c, which can be in communication and downstream of the transmit buffer 410a. An example of the transmit buffer 410a can correspond to a first-in-first-out (FIFO) memory. In this regard, the transmit buffer 410a can output lower and upper watermark indications that can facilitate determining, by the processor 405, whether the number of samples stored in the transmit buffer 410a is below the lower watermark (e.g., a lower threshold) or is above the upper watermark (e.g., an upper threshold). That is, the processor 405 can determine whether the FIFO memory is almost empty or almost full.

During operation, the processor 405 can be configured to communicate TX data to the transmit buffer 410a at a first rate when the data in the transmit buffer 410a falls below the lower watermark, and to stop sending TX data to the transmit buffer 410a when the data in the transmit buffer 410a reaches the upper watermark. The transmit buffer 410a can be configured to communicate the TX data to the TX circuitry 410c at a second rate that can be lower than the first rate.

The CA logic 410b can be configured to gate the communication of TX data in the transmit buffer 410a to the TX circuitry 410c based on the signal strength(s) (e.g., RSSI level, etc.) detected by the RX circuitry 410d within one or more channels of one or more frequency spectra. In this regard, the signal strength(s) may comprise one or more of the following: (1) an RSSI level that can be a measure of the RF energy level associated with a communication from a wireless device in a channel of a frequency spectrum; (2) a signal-to-noise ratio (SNR) associated with communication from a wireless device in a channel of a frequency spectrum (e.g., an SNR of a preamble transmission); and/or (3) an ambient RF energy level that can be a measure of the RF energy level of energy within a channel of a frequency spectrum (e.g., an RF energy level of all energy within the channel irrespective of its source). Measurement of signal strength(s) can be employed to minimize collisions that can occur between transmissions of groups of wireless devices. For example, when the signal strength(s) detected by the RX circuitry 410d is at or above threshold(s), the CA logic 410b can, in the logical sense, stop/gate the communication of the TX data from the transmit buffer 410a to the TX circuitry 410c. When the signal strength(s) detected by the RX circuitry 410d are below the threshold, the CA logic 410b can, in the logical sense, allow data in the transmit buffer 410a to be communicated to the TX circuitry 410c. In some examples, after the signal strength(s) fall below the threshold(s), the CA logic can wait a random amount of time (e.g., between 0 and 500 ms) before allowing the data in the transmit buffer 410a to be communicated to the TX circuitry 410c. The random delay can help mitigate interference that can otherwise occur between transmissions from other similarly gated wireless devices.

The TX circuitry 410c is configured to generate a radio frequency (RF) signal based on the TX data, and to output the RF signal via the RX/TX switch 410e to an antenna 415. For example, the TX circuitry 410c can be configured to modulate the TX data within the 5 GHz spectrum. In this regard, the TX circuitry 410c can include a quadrature amplitude modulator (QAM) to convert binary TX data to baseband in-phase and out-of-phase analog signals. The TX circuitry 410c can include a mixer to modulate the in-phase and out-of-phase baseband analog signals to a frequency range within the 5 GHz spectrum. The TX circuitry 410c can include a power amplifier to amplify the analog signals. In some examples, similar operations can occur to modulate the TX data within a different RF spectrum, such as the 2.4 GHz spectrum.

The RX circuitry 410d is configured to receive radio frequency (RF) signals via the RX/TX switch 410e and to output received data (RX data). For example, the RX circuitry 410d can include one or more amplifiers for amplifying RF signals received in the 2.4 GHz, 5 GHz, and/or 6 GHz spectrums. The RX circuitry 410d can include a mixer configured to down-convert the RF signals to baseband in-phase and out-of-phase signals. The RX circuitry 410d can include a QAM demodulator to convert the baseband in-phase and out-of-phase signals to a binary pattern (i.e., RX data).

An example of the RX circuitry 410d can be configured to measure the signal strength (e.g., RSSI value) of received RF signals. Within examples, the RX circuitry 410d can be configured to communicate the signal strength(s) to the CA logic 410b and/or the processor 405.

The RX/TX switch 410e is configured to selectively couple the antenna 415 to either the TX circuitry 410c or the RX circuitry 410d. In operation, when the TX circuitry 410c is ready to transmit data, the RX/TX switch 410e can be configured to couple the antenna 415 to the TX circuitry 410c. After the data has been transmitted, the RX/TX switch 410e can be configured to couple the antenna 415 to the RX circuitry 410d.

The antenna 415 is configured to radiate and/or detect electromagnetic waves. The antenna 415 may have any of a variety of constructions. For example, the antenna 415 can be a multi-band antenna (e.g., a dual-band antenna) configured to operate on several frequency spectra (e.g., two or more of: the 2.4 GHz spectrum, the 5 GHz spectrum, and the 6 GHz spectrum), such as a dual-band inverted-F antenna (IFA). In other examples, the antenna 415 can be a single-band antenna configured to operate on a single frequency spectrum (e.g., the 2.4 GHz spectrum, the 5 GHz spectrum, or the 6 GHz spectrum).

As noted above, the processor 405 can correspond to or include the capabilities of the processor 112a described above. For example, the processor 405 can communicate TX data, which can include audio content samples 300, to the wireless interface 410. The processor 405 can receive RX data from the wireless interface 410. Within examples, the RX data can include data related to user interactions with a particular SPD 212, such as user actuation of a volume or mute control of the SPD 212. The RX data can include data related to simple network time protocol (SNTP) polling, which can be utilized by the SPDs 212 to facilitate clock synchronization with the MPD 210. The RX data can include signal strength (e.g., RSSI level) measurements performed by wireless interfaces 410 of the SPDs 212. The signal strength measurements can represent the energy levels measured by the SPDs 212 that are associated with the transmission from the MPD 210 to the SPDs 212.

In some examples, the processor 405 can receive the signal strength(s) associated with signals detected by the wireless interface 410. In this case, the processor 405 can set the threshold(s) for the CA logic 410b based on the signal strength(s).

As noted above, the processor 405 can be in communication with the memory 112b. The memory 112b can store instruction code that is executable by the processor 405 for causing the processor 405 to implement or facilitate performing various operations.

It should be appreciated that the wireless interface 400 shown in FIG. 4 is only a logical diagram to facilitate description of various aspects of the disclosure. Accordingly, a wireless interface implemented using the techniques described herein may include different components (e.g., additional components, fewer components, etc.) arranged in a different fashion than are shown in FIG. 4. For example, a wireless interface that implements the techniques described herein may implement one or more functions of the CA logic 410b in program instructions executed by a processor (e.g., processor 405). Additionally (or alternatively), one or more components may be coupled between the elements shown in FIG. 4. For example, a diplexer may be coupled between the antenna 415 and the RX/TX switch 410e.

Figure 5:
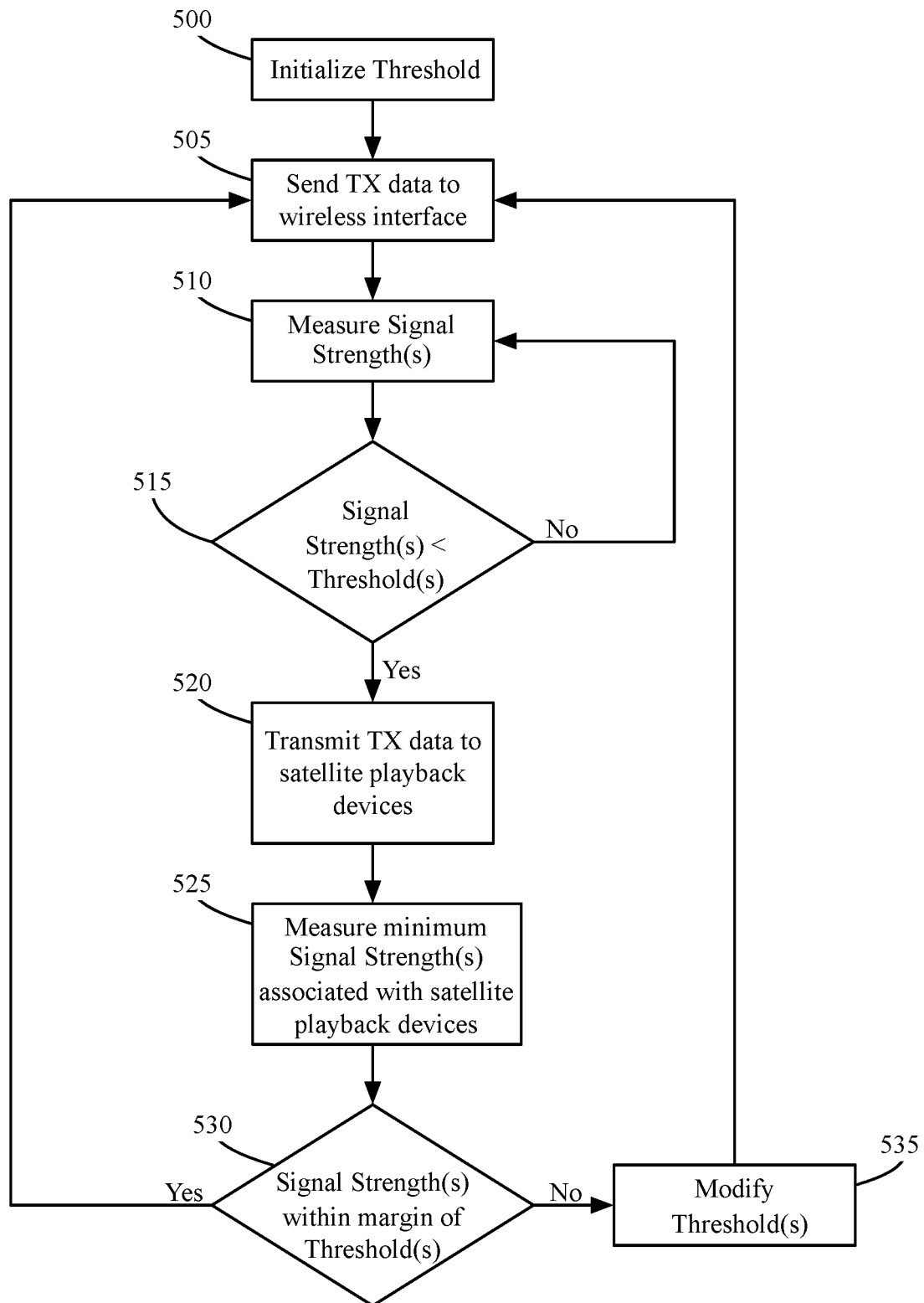
FIG. 5 illustrates operations that can be performed by a processor and/or a wireless interface of the circuitry to mitigate the interference issues, in accordance with an example.

FIG. 5 illustrate examples of operations that can be performed by the processor 405 and/or the wireless interface 410 of a device (e.g., a playback device) and/or a module for integration into a device to mitigate the interference issues described above. In this regard, the memory 112b can store program instructions that are executable by the processor 405 to cause the processor 405 to perform one or more of the operations shown in FIG. 5.

At block 500, the processor 405 can initialize the threshold(s) for the CA logic 410b. For example, the device can set the threshold(s) to a default value that is low enough to ensure that transmissions by the wireless interface 410 will not interfere with communications from the SPDs 212. For example, the processor 405 can set the threshold(s) to a default value. In other examples, the processor 405 can set the threshold(s) to a last used valued stored in memory. For example, the processor 405 may have previously determined an appropriate value for the threshold(s) (e.g., by executing one or more operations shown in FIG. 5) and stored that those values in memory (e.g., memory 112b). In this example, the processor 405 may retrieve those value(s) from memory to use for initialization.

At block 505, the processor 405 can communicate TX data to the transmit buffer 410a. For example, the processor 405 can communicate TX data associated with one or more audio content samples 300 to the transmit buffer 410a. The TX data can specify a specific time at which each SPD 212 should play corresponding channel samples associated with the one or more audio content samples 300.

At block 510, the RX/TX switch 410e can be configured to couple the antenna 415 to the RX circuitry 410d. The RX circuitry 410d can then monitor the signal strength(s) associated with any received network traffic and communicate the signal strength(s) associated with any received network traffic to the CA logic 410b and/or to the processor 405.

At block 515, if the signal strength(s) received from the RX circuitry 410d are at or above the threshold(s), the operations may continue from block 510. That is, the RX circuitry 410d can continue to monitor the signal strength(s) (e.g., RSSI levels associated with any received network traffic).

If the signal strength(s) received from the RX circuitry 410d are below the threshold(s), then at block 520, the RX/TX switch 410e can be configured to couple the antenna 415 to the TX circuitry 410c. The CA logic 410b can then close to allow TX data in the transmit buffer 410a to be communicated to the TX circuitry 410c at block 520. The TX circuitry 410c can subsequently communicate the TX data to corresponding SPDs 212.

At block 525, after transmission of the data has ceased, the RX/TX switch 410e can be configured to couple the antenna 415 to the RX circuitry 410d. The RX circuitry 410d can then monitor the signal strength(s) associated with any received network traffic and communicate the signal strength(s) associated with any received network traffic to the CA logic 410b and to the processor 405. Signal strength(s) associated with transmissions from the SPDs 212 can be communicated to the processor 405. Within examples, transmissions from the SPDs 212 can occur in response to user interactions with the SPDs 212, such as user actuation of a volume or mute control of the SPDs 212. Communications can occur in response to simple network time protocol (SNTP) polling, which can be utilized by the SPDs 212 to facilitate clock synchronization with the MPD 210. Communications can occur in response to transmission of channel samples to the SPDs 212. Communications can occur for other reasons.

At block 530, if the minimum signal strength(s) associated with communications from the SPDs 212 is within a margin of the current threshold(s) (e.g., 10 to 20 dbm greater than the threshold(s)), then the operations can repeat from block 505.

If the minimum signal strength(s) associated with communications from the SPDs 212 is not within the margin of the current signal strength(s), then at block 535, the threshold(s) can be modified to be within the margin above. For example, if the threshold(s) are below the minimum signal strength(s) by more than, for example, 20 dbm, the threshold(s) can be adjusted upward to be within 10 to 20 dbm below the minimum signal strength(s). If the threshold(s) are above the minimum signal strength(s) or within, for example, 10 dbm of the minimum signal strength(s), the threshold(s) can be adjusted downward to be within, for example, 10 to 20 dbm below the minimum signal strength(s). After adjustment of the threshold(s), the operations can repeat from block 505.

It should be appreciated that the particular values for various threshold(s) described herein are for illustrative purposes only and may be set to any of a variety of values based on the particular implementation. For example, the threshold(s) can be specified to be 25 dbm below the minimum signal strength(s), 20 dbm below the minimum signal strength(s), 15 dbm below the minimum signal strength(s), 10 dbm below the minimum signal strength(s), 5 dbm below the minimum signal strength(s), 2 dbm below the minimum signal strength(s), or 1 dbm below the minimum signal strength(s).

Figure 6B:
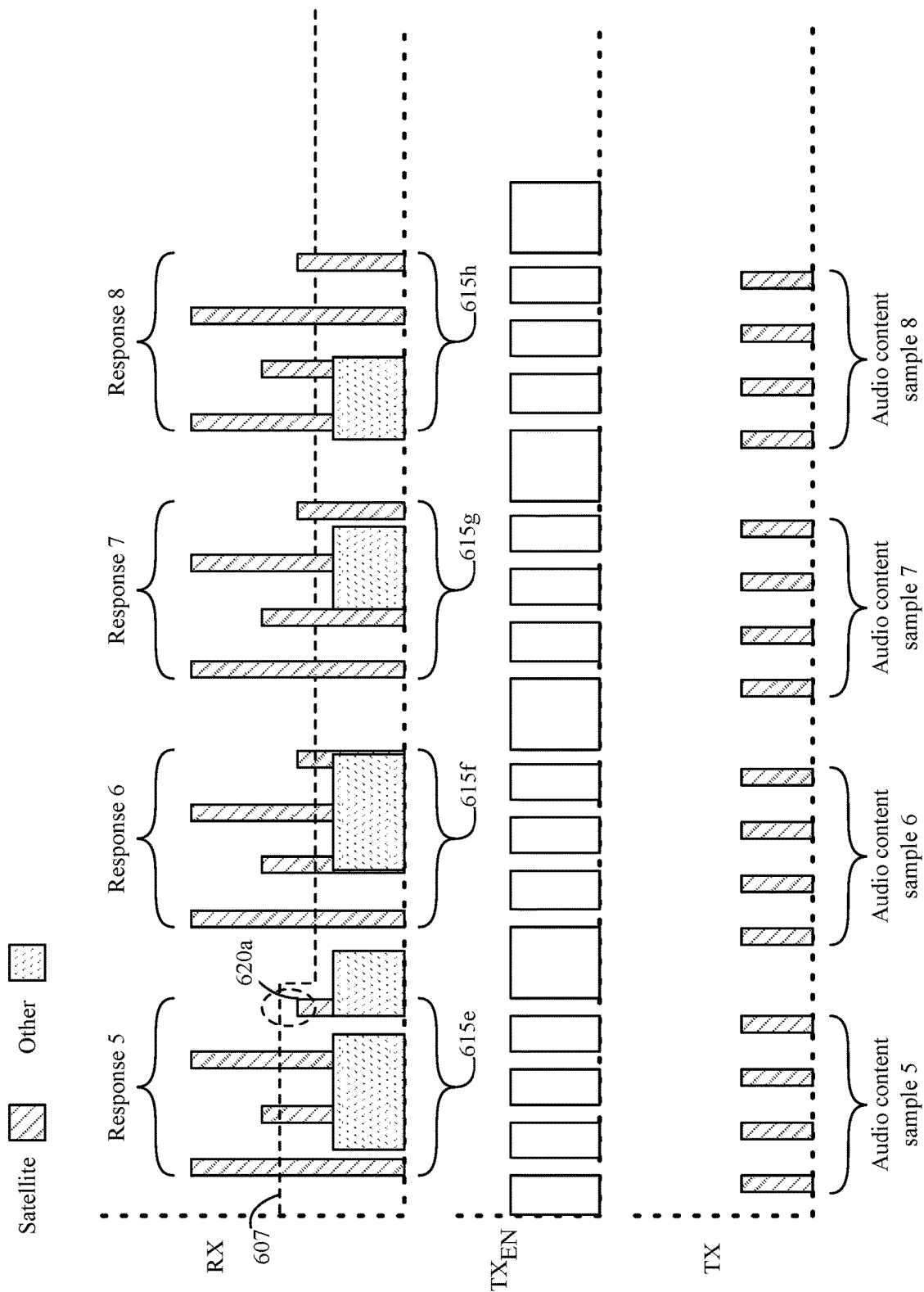

FIGS. 6A and 6B are example timing diagrams that illustrate adjustment of an example threshold (e.g., an RSSI threshold) in the operations above. Referring to FIG. 6A, the bottom timing diagram represents the transmission of data from the wireless interface 410 of the MPD 210 to the SPDs 212. For the sake of simplicity, the timing diagram assumes a home theater environment 200 having four SPDs 212. Each block in the bottom timing diagram represents the transmission of one channel sample (e.g., FL1 of channel sample 305a) to a corresponding SPD 212. Channel samples 305 associated with a particular audio content sample 300 are grouped together in the timing diagram.

The middle timing diagram represents the state of the CA logic 410b at any given time. A high value for $TX_{EN}$ indicates the CA logic 410b is logically closed and, therefore, that the wireless circuitry can transmit data stored in the transmit buffer 410a to the SPDs 212. A low value for $TX_{EN}$ indicates the CA logic 410b is logically open and, therefore, the transmission of the data stored in the transmit buffer 410a to the SPDs 212 is gated.

The top timing diagram depicts transmission blocks associated with transmissions that can be received by the wireless interface 410 over time. The amplitude of a particular transmission block represents the relative energy level of the transmission block as measured by the MPD 210. The key indicates whether a particular transmission block is associated with a transmission from an SPD 212 or another wireless device 220.

For the sake of simplicity, each transmission block from a particular SPD 212 is shown as being communicated in response to the transmission of a channel sample from the MPD 210. For example, each transmission block from a particular SPD 212 can indicate acknowledgment of receipt of a channel sample transmission from the MPD 210. However, in some examples, an SPD 212 may not necessarily acknowledge receipt of the channel sample. In these cases, the transmission block from a particular SPD 212 can correspond to, for example, a response to a polling requests initiated by the MPD 210, an SNTP transmission to synchronize an internal clock of the SPD 212, and/or a transmission communicated in response to a user actuation of a control of the SPD 212 such as a mute or volume actuation. A transmission block could be associated with other information communicated from the SPD 212.

The dashed line 607 running through the transmission blocks represents the relative value of the RSSI threshold used by the CA logic 410b to determine whether to allow transmission of TX data.

During a first interval 615a, the RSSI threshold 607 is set to an initial/default value. The CA logic 410b is enabled (i.e., closed). Therefore, the wireless interface 410 of the MPD 210 can transmit a channel sample associated with a first audio content sample to a corresponding SPD 212 and receive a response from the SPD 212. However, a transmission block 603a associated with a transmission from another wireless device 220 occurs immediately afterward, and the transmission has an RSSI value that is above the RSSI threshold 607. Thus, transmission, by the MPD 210, of the remaining channel samples to the corresponding SPDs 212 is gated/delayed until the transmission from the other wireless device 220 ends. (See delay D1.) Afterward, the MPD 210 resumes transmission of the remaining channel samples and receives a transmission from each SPD 212. After receiving the transmissions from each SPD 212, the MPD 210 can determine a new RSSI threshold 607 based on the RSSI values associated with the transmissions. During this interval, the RSSI threshold 607 is below the minimum RSSI level 610a. Therefore, the MPD 210 increases the RSSI threshold 607 by an incremental amount to a value that is still below the energy level of the transmission block 610a associated with the lowest energy level.

During a second interval 615b, the wireless interface 410 of the MPD 210 transmits channel samples associated with a second audio content sample to corresponding SPDs 212 and receives responses from the SPDs 212. As before, a transmission block 603b from another wireless device 220 that has an RSSI value above the RSSI threshold 607 occurs between transmission blocks of the SPDs 212. Thus, the transmission of certain channel samples to the corresponding SPDs 212 is gated/delayed until the transmission from the other wireless device 220 ends. (See delay D2.). Afterward, the MPD 210 resumes transmission of the remaining channel samples and receives a transmission from each SPD 212. After receiving the transmissions from each SPD 212, the MPD 210 can determine a new RSSI threshold 607 based on the RSSI values associated with the transmissions. During the second interval, the RSSI threshold 607 is still below the minimum RSSI level 610b. Therefore, the MPD 210 increases the RSS threshold 607 by an incremental amount to a value that is still below the energy level of the transmission block 610b associated with the lowest energy level.

During a third and fourth interval (615c and 614d), the wireless interface 410 of the MPD 210 transmits a channel sample associated with third and fourth audio content samples to corresponding SPDs 212 and receives responses from the SPDs 212. As before, transmission blocks (603c and 603d) associated with another wireless device 220 occur. However, in these cases, the RSSI level of the transmission blocks (603c and 603d) from the other wireless device 220 is below the current RSSI threshold 607. Therefore, no additional delay is incurred between transmissions of the channel samples to the corresponding SPDs 212. The MPD 210 can maintain the value of the RSSI threshold.

Referring to FIG. 6B, during a fifth interval 615e, the wireless interface 410 of the MPD 210 transmits a channel sample associated with a fifth audio content sample to corresponding SPDs 212 and receives responses from the SPDs 212. As before, transmissions from another wireless device 220 occur during this interval. However, no additional delay is incurred between the transmission of the channel samples because the RSSI level of transmissions from the other wireless device 220 is below the RSSI threshold 607. However, the RSSI level 620a associated with a particular transmission from a particular SPD 212 is below the RSSI threshold 607. Therefore, the MPD 210 can lower the RSSI threshold 607 to be below the RSSI level associated with the transmission from the SPD 212.

In the timing diagrams above, the RSSI threshold 607 incrementally moves to be within a margin of the RSSI value associated with the SPD 212 having the lowest associated RSSI level. For example, the RSSI threshold 607 can be adjusted by a fixed amount during each iteration. In some examples, the RSSI threshold 607 can be set in one iteration to be within the margin. Still, in other examples, the amount by which the RSSI threshold 607 is adjusted can be different during different intervals. For example, the RSSI threshold 607 can be adjusted according to an algorithm such as a steepest descent algorithm to facilitate coming to within a margin of the lowest RSSI value more quickly.

Still, in other examples, the RSSI threshold 607 can be adjusted after multiple audio content samples have been communicated to the SPDs. For example, after the channel samples for a group of audio content samples have been communicated to the SPDs, and responses have been received from the SPDs, the average (e.g., moving average) minimum RSSI level can be used as the basis for adjusting the RSSI threshold 607. This process can repeat after a particular number of audio content samples (e.g., 100 samples) have been communicated and/or after a certain amount of time has passed (e.g., 2 seconds).

In some examples, one or more components of the logical diagram 400 of FIG. 4 can be implemented by a dedicated transceiver. An example of such a receiver can be an 802.11 (e.g., 802.11a, 802.11b, 802.11g, 802.11n, 802.11ac, 802.11ax, etc.) transceiver. The 802.11 transceiver can include registers that facilitate setting the above-referenced threshold(s) and circuitry for performing the operations of the CA logic. For example, the 802.11 transceiver can include one or more registers that facilitate setting a signal detect (SD) threshold and/or an energy detect (ED) threshold of clear channel assessment logic (CCA logic). The value of the SD threshold register and/or the ED threshold register can be set to correspond to the above referenced threshold(s). The SD threshold register and/or the ED threshold register can be dynamically adjusted, as indicated above, to be within a margin of the lowest signal strength(s) (e.g., RSSI levels) associated with the SPDs 212.

Further, while the logical diagram 400 of FIG. 4 is described as being part of an MBP 210, which can include one or more speakers, a power supply, housing, etc. in some examples, one or more of more components of the circuitry can be provided on a module. An example of the module can include a circuit board. A wireless network interface, audio input interface, one or more processors, and data storage can be mounted on the circuit board. Within examples, the wireless network interface and the one or more processors can implement the operations of the processor 405 and the wireless interface 410 of FIG. 4. The data storage can store instructions that, when executed by the one or more processors, cause the module to perform one or more of the operations described above.

Figure 7:
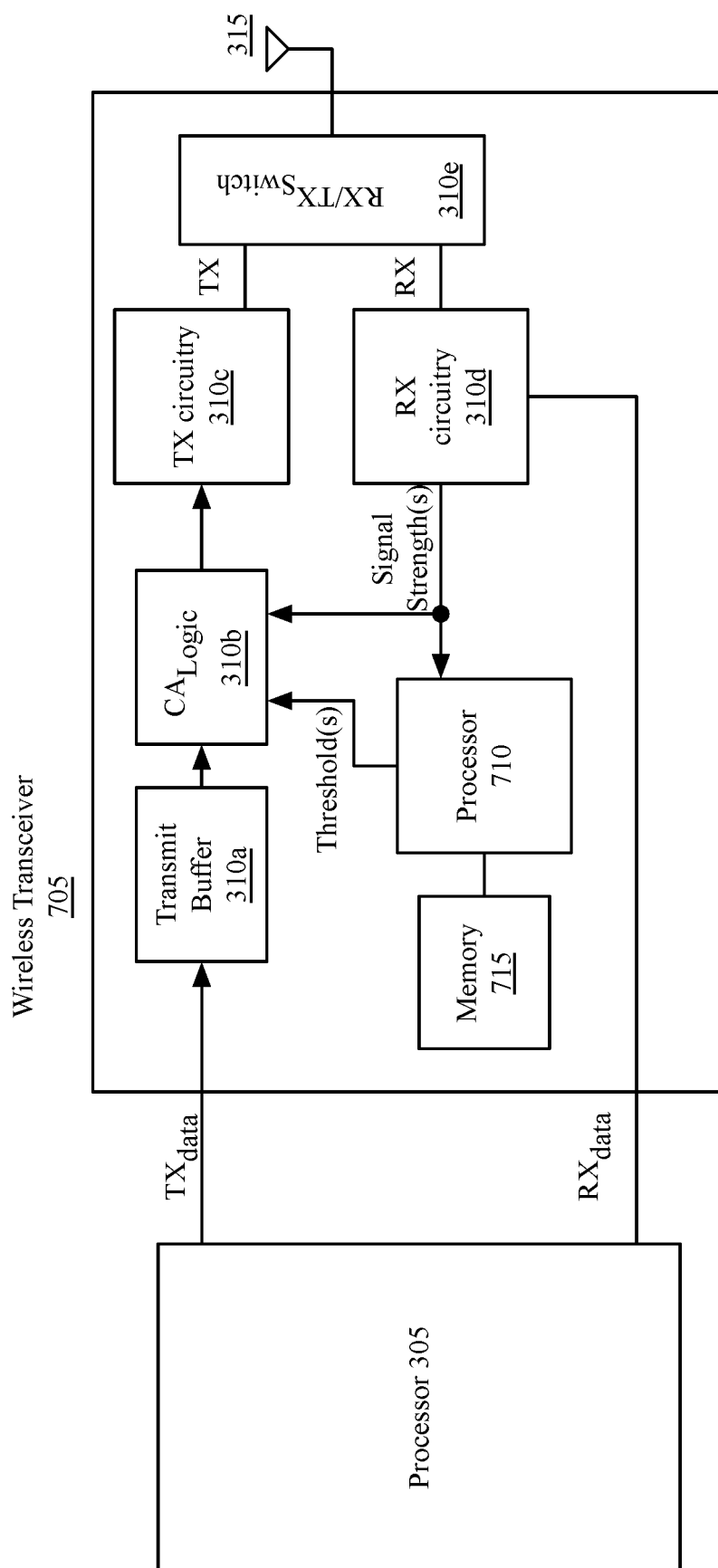
FIG. 7 illustrates a logical diagram of a wireless interface that can perform the RSSI modification functionality, in accordance with an example.

FIG. 7 illustrates an example of a wireless transceiver 705 that can perform the latency reduction techniques described herein. Referring to FIG. 7, the wireless transceiver 705 can include a processor 710 and a memory 715, such as read-only memory (ROM) for storing instruction code (e.g., firmware) for execution by the processor 710. The processor 710 can be separate and distinct from the processor 405 of FIG. 4. Firmware can be stored in the memory 715 and can be executed by the processor 710 to cause the processor 710 to perform the functionality implemented by the processor 405 of FIG. 4 with respect to the modification of the threshold(s). In this example, the processor 405 of FIG. 4 can be used instead to handle aspects related to receiving audio from an audio source and communicating audio content samples to the wireless transceiver 705. In some examples, driver instruction code can be executed by the first processor 405 to cause the first processor to download firmware instructions into the memory 715 of the wireless transceiver 705 for causing the processor 710 of the wireless transceiver 705 to perform the threshold modification functionality described above.

It should be appreciated that the wireless interface 700 shown in FIG. 7 is only a logical diagram to facilitate description of various aspects of the disclosure. Accordingly, a wireless transceiver implemented using the techniques described herein may include different components (e.g., additional components, fewer components, etc.) arranged in a different fashion than are shown in FIG. 7. For example, a wireless transceiver that implements the techniques described herein may not include the RX/TX switch 310*e*.

Figure 8:
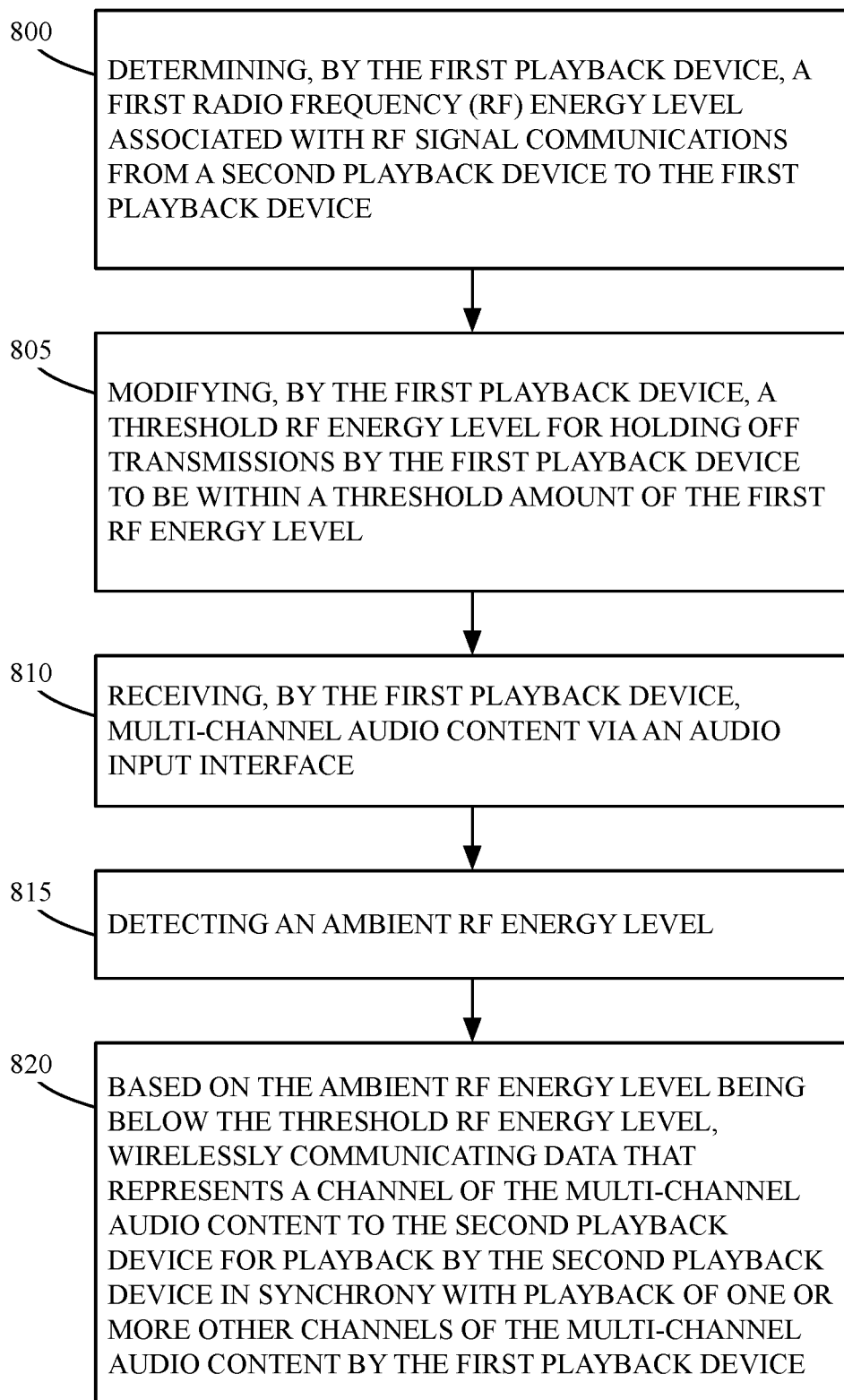
FIG. 8 illustrates a variation of the operations performed in FIG. 5, in accordance with an example.

FIG. 8 illustrates a variation of the operations performed above. Block 800 can involve determining, by the first playback device, a first RF energy level associated with RF signal communications from a second playback device to the first playback device.

Block 805 can involve modifying, by the first playback device, a threshold RF energy level for holding off transmissions by the first playback device to be within a threshold amount of the first RF energy level.

Block 810 can involve receiving, by the first playback device, multi-channel audio content via an audio input interface.

Block 815 can involve detecting an ambient RF energy level.

Block 820 can involve, based on the ambient RF energy level being below the threshold RF energy level, wirelessly communicating data that represents a channel of the multi-channel audio content to the second playback device for playback by the second playback device in synchrony with playback of one or more other channels of the multi-channel audio content by the first playback device.

Some examples can involve determining, by the first playback device, a second RF energy level associated with second RF signal communications from a third playback device to the first playback device; and specifying the threshold RF energy level for holding off the transmissions by the first playback device to be within a threshold amount of a lower of the first RF energy level and the second RF energy level.

In some examples, determining the first RF energy level associated with RF signal communications can involve determining the first RF energy level based on a received signal strength indicator message (RSSI message) communicated from the second playback device to the first playback device.

In some examples, the ambient RF energy level corresponds to an RF energy level associated with an RF channel through which the first playback device communicates with the second playback device.

In some examples, the first playback device comprises an 802.11 based transceiver. These examples can involve setting, by the first playback device, a signal detect (SD) threshold and/or an energy detect (ED) threshold of clear channel assessment (CCA) logic of the 802.11 based transceiver to value(s) associated with the threshold RF energy level.

IV. Conclusion

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for the implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways to implement such systems, methods, apparatus, and/or articles of manufacture.

It should be appreciated that the latency reduction techniques may be advantageously implemented in any of a variety devices (e.g., playback devices) separate and apart from those specific playback devices configured to receive audio content from a television. For example, the latency reduction techniques may be readily integrated into a television itself (or any other playback device that displays video content) that wirelessly communicates the audio content to other devices (e.g., a soundbar, a sub, rear satellites, etc.) for playback in synchrony with the displayed video content. While such a television could simply delay output of the video content to accommodate the time needed to successfully transmit all the audio to the other devices for playback, such a design would undesirably increase the input lag of the television. Thus, the latency reduction techniques described herein may be readily implemented in such a television (or any other playback device that displays video content) so as to limit (and/or eliminate) the delay that would need to otherwise be introduced to accommodate the wireless transmission of the audio content to the requisite devices.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well-known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

V. Example Features (Feature 1) A first playback device comprising: a wireless network interface; an audio input interface; one or more processors; at least one non-transitory computer-readable medium; and program instructions stored on the non-transitory computer-readable medium that are executable by the at least one processor such that the first playback device is configured to: determine a first radio frequency (RF) energy level associated with RF signal communications from a second playback device to the first playback device; modify a threshold RF energy level for holding off transmissions by the first playback device based on the first RF energy level; and after receipt of multi-channel audio content via the audio input interface, detect an ambient RF energy level; and based on the ambient RF energy level and the threshold RF energy level, communicate, via the wireless network interface, data that represents a channel of the multi-channel audio content to the second playback device for playback by the second playback device in synchrony with playback of one or more other channels of the multi-channel audio content by the first playback device.

(Feature 2) The first playback device of feature 1, further comprising program instructions stored on the at least one non-transitory computer-readable medium that are executable by the at least one processor such that the first playback device is configured to: determine a second RF energy level associated with second RF signal communications from a third playback device to the first playback device; and increase the threshold RF energy level for holding off the transmissions by the first playback device to be within a threshold amount of a lower of the first RF energy level and the second RF energy level.

(Feature 3) The first playback device of feature 1 or 2, further comprising program instructions stored on the at least one non-transitory computer-readable medium that are executable by the at least one processor such that the first playback device is configured to: determine the first RF energy level based on one or more received signal strength indicator (RSSI) values associated with at least one message communicated from the second playback device to the first playback device.

(Feature 4) The first playback device of any of features 1-3, further comprising program instructions stored on the at least one non-transitory computer-readable medium that are executable by the at least one processor such that the first playback device is configured to: determine that the RF signal communications from the second playback device have ceased; and incrementally lower the threshold RF energy level until the RF signal communications from the second playback device resume.

(Feature 5) The first playback device of feature 4, wherein the program instructions that are executable by the at least one processor such that the first playback device is configured to determine that the RF signal communications from the second playback device have ceased comprises program instructions that are executable by the at least one processor such that the first playback device is configured to: receive an indication from the second playback device, via a third playback device in communication with both the first playback device and the second playback device, that the RF signal communications have ceased.

(Feature 6) The first playback device of any of features 1-5, wherein the ambient RF energy level corresponds to an RF energy level associated with an RF channel through which the first playback device communicates with the second playback device.

(Feature 7) The first playback device of any of features 1-6, wherein the multi-channel audio content is synchronized to video content, wherein an audio delay between the multi-channel audio content received via the audio input interface and the multi-channel audio content played from the second playback device is less than 40 ms.

(Feature 8) The first playback device of any of features 1-7, wherein the first playback device communicates the multi-channel audio content to the second playback device over a 20 Mhz channel in a 5 GHz frequency spectrum.

(Feature 9) The first playback device of any of features 1-8, wherein the wireless network interface comprises an 802.11 based transceiver and wherein the threshold RF energy level for holding off wireless transmissions comprises at least one of: a signal detect (SD) threshold of a clear channel assessment logic in the 802.11 based transceiver or an energy detect (ED) threshold of the clear channel assessment logic in the 802.11 based transceiver.

(Feature 10) The first playback device of any of features 1-9, wherein the threshold RF energy is specified to be 10 dbm below the first RF energy level, 5 dbm below the first RF energy level, or 2 dbm below the first RF energy level.

(Feature 11) The first playback device of any of features 1-10, wherein the one or more processors include a first processor integrated into a wireless transceiver and a second processor that is separate and distinct from the wireless transceiver, and wherein the at least one non-transitory computer-readable medium comprises a read-only memory (ROM) storing a first portion of the program instructions executed by the first processor and a read-write memory storing a second portion of the program instructions executed by the second processor.

(Feature 12) A method performed by a first playback device of a home theater system comprising: determining, by the first playback device, a first radio frequency (RF) energy level associated with RF signal communications from a second playback device to the first playback device; modifying, by the first playback device, a threshold RF energy level for holding off transmissions by the first playback device to be within a threshold amount of the first RF energy level; receiving, by the first playback device, multi-channel audio content via an audio input interface; detecting an ambient RF energy level; and based on the ambient RF energy level being below the threshold RF energy level, wirelessly communicating data that represents a channel of the multi-channel audio content to the second playback device for playback by the second playback device in synchrony with playback of one or more other channels of the multi-channel audio content by the first playback device.

(Feature 13) The method of feature 12, further comprising: determining, by the first playback device, a second RF energy level associated with second RF signal communications from a third playback device to the first playback device; and specifying the threshold RF energy level for holding off the transmissions by the first playback device to be within a threshold amount of a lower of the first RF energy level and the second RF energy level.

(Feature 14) The method of feature 12 or 13, wherein determining the first RF energy level associated with RF signal communications further comprises determining the first RF energy level based on a received signal strength indicator message (RSSI message) communicated from the second playback device to the first playback device.

(Feature 15) The method of any of features 12-14, wherein the ambient RF energy level corresponds to an RF energy level associated with an RF channel through which the first playback device communicates with the second playback device.

(Feature 16) The method of any of features 12-15, wherein the first playback device comprises an 802.11 based transceiver, wherein the method comprises setting, by the first playback device, a signal detect threshold (SD threshold) of clear channel assessment logic (CCA logic) of the 802.11 based transceiver to a value associated with the threshold RF energy level.

(Feature 17) Circuitry for a playback device, the circuitry comprising: a wireless network interface; an audio input interface; one or more processors; at least one non-transitory computer-readable medium; and program instructions stored on the non-transitory computer-readable medium that are executable by the at least one processor such that a playback device into which the circuitry is integrated is configured to: determine a first radio frequency (RF) energy level associated with RF signal communications from another playback device; modify a threshold RF energy level for holding off wireless transmissions via the wireless network interface based on the first RF energy level; and after receipt of multi-channel audio content via the audio input interface, detect an ambient RF energy level; and based on the ambient RF energy level and the threshold RF energy level, communicate, via the wireless network interface, data that represents a channel of the multi-channel audio content to the other playback device for playback by the other playback device in synchrony with playback of one or more other channels of the multi-channel audio content by a playback device into which the circuitry is integrated.

(Feature 18) The circuitry of feature 17, further comprising at least one circuit board and wherein at least one of: the wireless network interface, the audio input interface, the one or more processors, or the at least one non-transitory computer-readable medium is attached to the at least one circuit board.

(Feature 19) The circuitry of feature 17 or 18, further comprising program instructions stored on the at least one non-transitory computer-readable medium that are executable by the at least one processor such that a playback device into which the circuitry is integrated is configured to: determine the first RF energy level based on a received signal strength indicator message (RSSI message) communicated from the other playback device.

(Feature 20) The circuitry of any of features 17-19, wherein the ambient RF energy level corresponds to an RF energy level associated with an RF channel through which the circuitry communicates with the second playback device.

(Feature 21) The circuitry of any of features 17-20, wherein the wireless network interface comprises an 802.11 based transceiver and wherein the threshold RF energy level for holding off wireless transmissions comprises at least one of: a signal detect (SD) threshold of a clear channel assessment logic in the 802.11 based transceiver or an energy detect (ED) threshold of the clear channel assessment logic in the 802.11 based transceiver.

(Feature 22) A first playback device comprising: a wireless network interface; a media input interface; one or more processors; at least one non-transitory computer-readable medium; and program instructions stored on the non-transitory computer-readable medium that are executable by the at least one processor such that the first playback device is configured to: determine a first radio frequency (RF) energy level associated with RF signal communications from a second playback device to the first playback device; modify a sensitivity of a collision avoidance mechanism for holding off transmissions by the first playback device based on the first RF energy level; and after receipt of media content via the media input interface, detect an ambient RF energy level; and based on the ambient RF energy level and the threshold RF energy level, communicate, via the wireless network interface, data that represents a first portion of the media content to the second playback device for playback by the second playback device in synchrony with playback of a second portion of the media content by the first playback device.

(Feature 23) The first playback device of feature 22, wherein the first playback device is a television, the first portion of the media content comprises audio content, and the second portion of the media content comprises video content.

(Feature 24) The first playback device of feature 22 or 23, wherein the second playback device is a soundbar.

The invention claimed is:

1. A first playback device comprising:
a wireless network interface;
an audio input interface;
at least one processor;
at least one non-transitory computer-readable medium; and
program instructions stored on the non-transitory computer-readable medium that are executable by the at least one processor such that the first playback device, when operating in a home theater system comprising the first playback device and a plurality of satellite playback devices, is configured to:
receive multi-channel audio content via the audio input interface;
decode the multi-channel audio content into a plurality of audio channels;
simultaneously transmit, via the wireless network interface, data representing a first audio channel of the plurality of audio channels to a first satellite playback device of the plurality of satellite playback devices over a first radio frequency (RF) sub-channel for playback by the first satellite playback device, and data representing a second audio channel of the plurality of audio channels to a second satellite playback device of the plurality of satellite playback devices over a second RF sub-channel within a same RF channel as the first RF sub-channel for playback by the second satellite playback device in synchrony with playback of the first audio channel by the first satellite playback device;
determine a first RF energy level associated with RF signal communications from the first satellite playback device to the first playback device;
determine a second RF energy level associated with RF signal communications from the second satellite playback device to the first playback device; and
modify a threshold RF energy level for holding off transmissions by the first playback device based on the first and second RF energy levels.

2. The first playback device of claim 1, wherein the program instructions that are executable by the at least one processor such that the first playback device is configured to simultaneously transmit the data representing the first audio channel to the first satellite playback device and the data representing the second audio channel to the second satellite playback device comprise program instructions that are executable by the at least one processor such that the first playback device is configured to:
simultaneously transmit the data representing the first audio channel to the first satellite playback device and the data representing the second audio channel to the second satellite playback device for playback of the first and second audio channels by the first and second satellite playback devices, respectively, in synchrony with playback one or more other audio channels of the multi-channel audio content by the first playback device.

3. The first playback device of claim 2, wherein the wireless network interface includes an 802.11 based transceiver configured to establish the same RF channel within at least one of a 5 GHz frequency spectrum or a 6 GHz frequency spectrum.

4. The first playback device of claim 1, wherein the same RF channel is a first RF channel, and further comprising program instructions stored on the at least one non-transitory computer-readable medium that are executable by the at least one processor such that the first playback device is configured to:
transmit, via the wireless network interface, data representing a third audio channel of the plurality of audio channels to a third satellite playback device over a second RF channel for playback by the third satellite playback device in synchrony with playback of the first audio channel by the first satellite playback device and playback of the second audio channel by the second satellite playback device.

5. The first playback device of claim 1, further comprising program instructions stored on the non-transitory computer-readable medium that are executable by the at least one processor such that the first playback device is configured to:
after receipt of the multi-channel audio content via the audio input interface, detect an ambient RF energy level of wireless activity in the same RF channel; and
based on the ambient RF energy level being below the threshold RF energy level, transmit, via the wireless network interface, the data representing the first and second audio channels to the first and second satellite playback devices, respectively.

6. The first playback device of claim 1, further comprising program instructions stored on the at least one non-transitory computer-readable medium that are executable by the at least one processor such that the first playback device is configured to:
determine the first and second RF energy levels based on one or more received signal strength indicator (RSSI) values associated with at least one message communicated to the first playback device from the first and second satellite playback devices, respectively.

7. The first playback device of claim 6, further comprising program instructions stored on the non-transitory computer-readable medium that are executable by the at least one processor such that the first playback device is configured to:
determine an average minimum RSSI level based on the first and second RF energy levels; and
modify the threshold RF energy level based on the average minimum RSSI level.

8. The first playback device of claim 1, further comprising program instructions stored on the at least one non-transitory computer-readable medium that are executable by the at least one processor such that the first playback device is configured to:

determine that the RF signal communications from the first satellite playback device have ceased; and incrementally lower the threshold RF energy level until the RF signal communications from the first satellite playback device resume.

9. The first playback device of claim 1, wherein the multi-channel audio content is synchronized to video content, wherein an audio delay between the multi-channel audio content received via the audio input interface and the audio channels played from the first and second satellite playback devices is less than 40 ms.

10. The first playback device of claim 1, wherein the first playback device is a soundbar, and further comprising program instructions stored on the at least one non-transitory computer-readable medium that are executable by the at least one processor such that the first playback device is configured to play back a third audio channel of the plurality of audio channels in synchrony with playback of the first and second audio channels by the first and second satellite playback devices, respectively.

11. A first playback device configured to provide audio content to a plurality of satellite playback devices, the first playback device comprising:

a wireless network interface;
an audio input interface;
at least one processor;
at least one non-transitory computer-readable medium; and
program instructions stored on the non-transitory computer-readable medium that are executable by the at least one processor such that the first playback device is configured to:
receive multi-channel audio content via the audio input interface;
establish, via the wireless network interface, a dedicated radio frequency (RF) wireless network for communication between the first playback device and the plurality of satellite playback devices;
decode the multi-channel audio content into a plurality of audio channels;
simultaneously transmit, via the wireless network interface, data streams representing respective audio channels of a subset of the plurality of audio channels to the plurality of satellite playback devices over at least one RF channel on the dedicated RF wireless network using orthogonal frequency-division multiple access, each respective audio channel of the subset being transmitted to a corresponding one of the plurality of satellite playback devices for playback in synchrony with playback of one or more other audio channels of the multi-channel audio content by the first playback device;
determine RF energy levels associated with RF signal communications in the at least one RF channel from each of at least a subset of the plurality of satellite playback devices to the first playback device;
modify a threshold RF energy level for holding off transmissions by the first playback device based on the RF energy levels; and
after receipt of multi-channel audio content via the audio input interface,
detect an ambient RF energy level in the at least one RF channel, and
based on the ambient RF energy level being below the threshold RF energy level, simultaneously transmit, via the wireless network interface, the data streams representing the respective audio channels to the plurality of satellite playback devices over the at least one RF channel.

12. The first playback device of claim 11, wherein the wireless network interface includes an 802.11 based transceiver configured to establish the dedicated RF wireless network using at least one of a 5 GHz frequency spectrum or a 6 GHz frequency spectrum.

13. The first playback device of claim 12, wherein the at least one RF channel is a 20 MHz RF channel with the at least one of the 5 GHz frequency spectrum or the 6 GHz frequency spectrum.

14. The first playback device of claim 11, wherein the multi-channel audio content is synchronized to video content, wherein an audio delay between the multi-channel audio content received via the audio input interface and the audio channels played from the plurality of satellite playback devices is less than 40 ms.

15. The first playback device of claim 11, further comprising program instructions stored on the non-transitory computer-readable medium that are executable by the at least one processor such that the first playback device is configured to:

simultaneously transmit, via the wireless network interface, a first subset of the data streams to a first subset of the plurality of satellite playback devices over a first RF channel on the dedicated RF wireless network using orthogonal frequency-division multiple access; and
simultaneously transmit, via the wireless network interface, a second subset of the data streams to a second subset of the plurality of satellite playback devices over a second RF channel on the dedicated RF wireless network using orthogonal frequency-division multiple access.

16. The first playback device of claim 11, further comprising program instructions stored on the at least one non-transitory computer-readable medium that are executable by the at least one processor such that the first playback device is configured to:
determine the RF energy levels based on one or more received signal strength indicator (RSSI) values associated with at least one message communicated to the first playback device from each of the subset of the plurality of satellite playback devices.

17. The first playback device of claim 11, further comprising program instructions stored on the at least one non-transitory computer-readable medium that are executable by the at least one processor such that the first playback device is configured to:
determine that the RF signal communications from the subset of satellite playback devices have ceased; and
incrementally lower the threshold RF energy level until the RF signal communications from the subset of satellite playback devices resume.

18. The first playback device of claim 11, wherein the first playback device is a soundbar.

* * * * *